US011125967B2

(12) United States Patent
Gladnick et al.

(10) Patent No.: US 11,125,967 B2
(45) Date of Patent: Sep. 21, 2021

(54) SYSTEM AND METHOD FOR CALIBRATING VARIABLE FOCAL LENGTH LENS SYSTEM USING CALIBRATION OBJECT WITH PLANAR TILTED PATTERN SURFACE

(71) Applicant: Mitutoyo Corporation, Kanagawa-ken (JP)

(72) Inventors: Paul Gerard Gladnick, Seattle, WA (US); Dawn Keehnel, Redmond, WA (US); Vahan Senekerimyan, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 455 days.

(21) Appl. No.: 16/232,874

(22) Filed: Dec. 26, 2018

(65) Prior Publication Data
US 2020/0209519 A1 Jul. 2, 2020

(51) Int. Cl.
*H04N 5/225* (2006.01)
*G02B 7/10* (2021.01)
(Continued)

(52) U.S. Cl.
CPC .......... *G02B 7/102* (2013.01); *H04N 5/2254* (2013.01); *H04N 5/2353* (2013.01); *H04N 5/23212* (2013.01); *H04N 5/30* (2013.01)

(58) Field of Classification Search
CPC .............................. G02B 7/102; H04N 5/2254
(Continued)

(56) References Cited

U.S. PATENT DOCUMENTS 6,542,180 B1 4/2003 Wasserman et al.
7,003,161 B2 2/2006 Tessadro
(Continued)

FOREIGN PATENT DOCUMENTS

| CN | 100430685 C | 11/2008 |
| CN | 100487733 C | 5/2009 |
| CN | 107367817 A | 11/2017 |

OTHER PUBLICATIONS

Mermillod-Blondin et al., "High-speed varifocal imaging with a tunable acoustic gradient index of refraction lens," *Optics Letters* 33(18):2146-2148, 2008.
(Continued)

*Primary Examiner* — Joel W Fosselman
(74) *Attorney, Agent, or Firm* — Seed IP Law Group LLP

(57) ABSTRACT

A system and method are provided for utilizing a focus state calibration object for determining calibration data for a variable focal length (VFL) lens system which includes a VFL lens (e.g., a tunable acoustic gradient lens). The calibration object includes a planar tilted pattern surface on which a set of focus state reference regions (FSRRs) are distributed (e.g., a tilted grating). The FSRRs have known geometric relationships relative to the planar tilted pattern surface and have known region relationships relative to one another. A plurality of camera images is acquired at different phase timings of the periodic modulation, and calibration data is determined based at least in part on analyzing the plurality of camera images. The determined calibration data indicates respective phase timings of the periodic modulation that correspond to respective effective focus positions of the VFL lens system.

23 Claims, 15 Drawing Sheets

(51) Int. Cl.
*H04N 5/30* (2006.01)
*H04N 5/232* (2006.01)
*H04N 5/235* (2006.01)

(58) Field of Classification Search
USPC .......................................................... 359/694
See application file for complete search history.

(56) References Cited

U.S. PATENT DOCUMENTS

| | | | |
|---|---|---|---|
| 7,030,351 B2 | 4/2006 | Wasserman et al. | |
| 7,324,682 B2 | 1/2008 | Wasserman | |
| 7,454,053 B2 | 11/2008 | Bryll et al. | |
| 7,570,795 B2 | 8/2009 | Yu et al. | |
| 7,627,162 B2 | 12/2009 | Blanford et al. | |
| 7,873,488 B2 | 1/2011 | Nahum et al. | |
| 8,111,905 B2 | 2/2012 | Campbell | |
| 8,111,938 B2 | 2/2012 | Bryll et al. | |
| 9,060,117 B2 | 6/2015 | Bryll et al. | |
| 9,143,674 B2 | 9/2015 | Gladnick | |
| 9,602,715 B2 | 3/2017 | Gladnick | |
| 9,726,876 B2 | 8/2017 | Bryll | |
| 9,736,355 B1 | 8/2017 | Bryll | |
| 9,774,765 B2 | 9/2017 | Bryll et al. | |
| 9,830,694 B2 | 11/2017 | Bryll | |
| 9,961,253 B2 | 5/2018 | Bryll et al. | |
| 10,101,572 B2 | 10/2018 | Bryll et al. | |
| 10,151,962 B2 | 12/2018 | Gladnick et al. | |
| 10,171,725 B1 * | 1/2019 | Nahum | H04N 5/2251 |
| 2017/0078549 A1 | 3/2017 | Emtman et al. | |
| 2017/0324895 A1 * | 11/2017 | Bryll | H04N 5/23216 |

OTHER PUBLICATIONS

Mitutoyo Corporation & Micro Encoder Inc. "QVPAK 3D CNC Vision Measuring Machine: Operation Guide," Version 2.0, Manual No. 4911GB, Series No. 359, 1$^{st}$ Ed., Sep. 1996, 86 pages.

The First Office Action, issued Jul. 5, 2021, for corresponding CN Application No. 201911336459.8, 11 pages. (With English Translation).

* cited by examiner

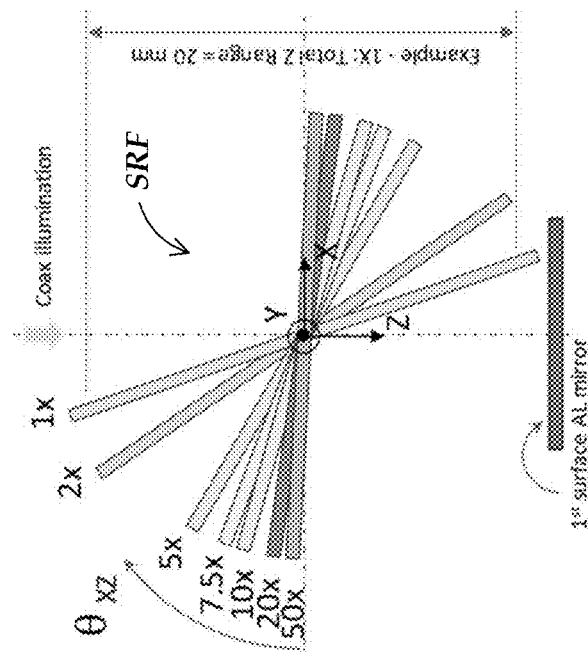
| Nom. Magnification* | OBJ X FOV (mm) | OBJ Y FOV (mm) | OBJ Total System Focus Range +- 1 DPT (mm) | OBJ To Cover Z Range: Tilt (°) |
|---|---|---|---|---|
| 1x | 6.784 | 5.427 | 20 | 71.3 |
| 2x | 3.392 | 2.714 | 5 | 55.8 |
| 5x | 1.357 | 1.085 | 0.8 | 30.5 |
| 7.5x | 0.905 | 0.724 | 0.356 | 21.5 |
| 10x | 0.678 | 0.543 | 0.2 | 16.4 |
| 20x | 0.339 | 0.271 | 0.05 | 8.4 |
| 50x | 0.136 | 0.109 | 0.008 | 3.4 |
*Fig.5A.*     *Fig.5B.*

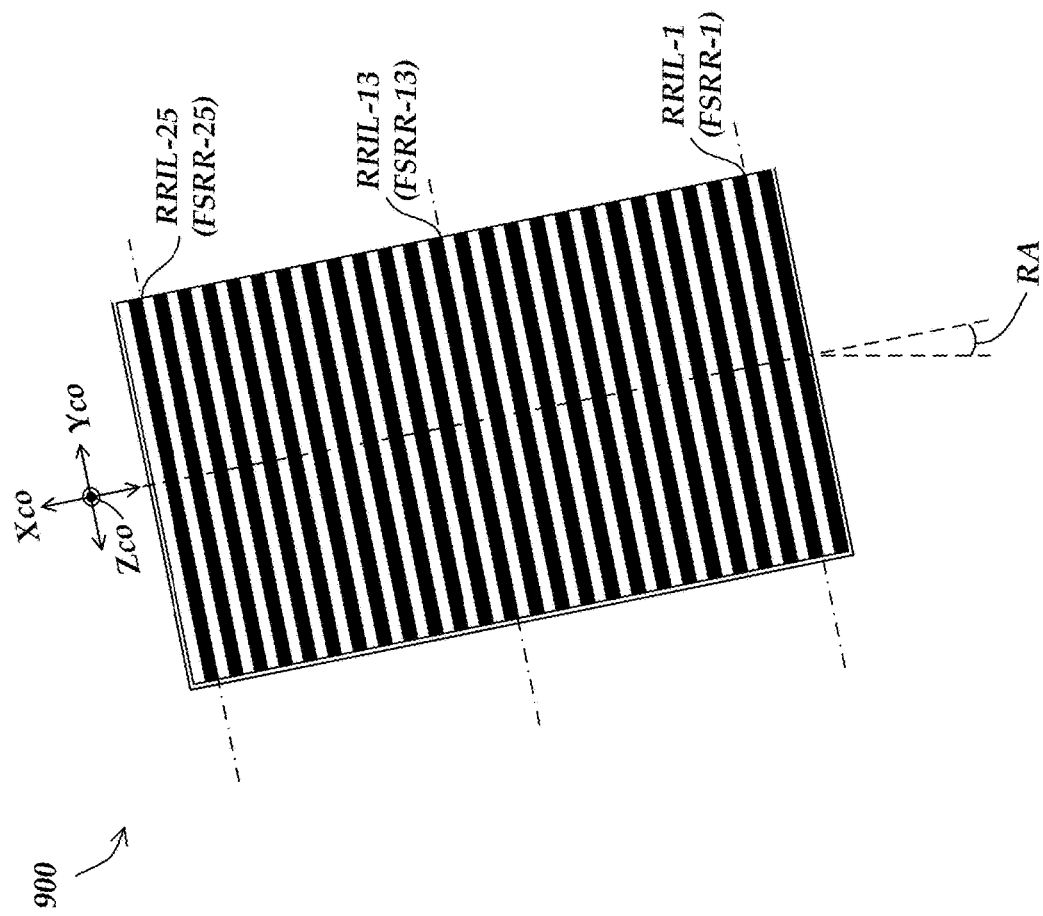
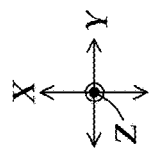
Fig. 9.

SYSTEM AND METHOD FOR CALIBRATING VARIABLE FOCAL LENGTH LENS SYSTEM USING CALIBRATION OBJECT WITH PLANAR TILTED PATTERN SURFACE

BACKGROUND

Technical Field

This disclosure relates to precision metrology using a high-speed variable focal length (VFL) lens (e.g., in a machine vision inspection system), and more particularly to performing calibration for a VFL imaging system.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of either small or relatively large workpieces.

General-purpose precision machine vision inspection systems are generally programmable to provide automated video inspection. Such systems typically include GUI features and predefined image analysis "video tools," such that operation and programming can be performed by "non-expert" operators. For example, U.S. Pat. No. 6,542,180, which is hereby incorporated herein by reference in its entirety, teaches a vision system that uses automated video inspection including the use of various video tools.

Multi-lens variable focal length (VFL) optical systems may be utilized for observation and precision measurement of surface heights, and may be included in a microscope and/or precision machine vision inspection system, for example as disclosed in U.S. Pat. No. 9,143,674, which is hereby incorporated herein by reference in its entirety. Briefly, a VFL lens is capable of acquiring multiple images at multiple focal lengths, respectively. One type of known VFL lens is a tunable acoustic gradient ("TAG") lens that creates a lensing effect using sound waves in a fluid medium. The sound waves may be created by application of an electrical field at a resonant frequency to a piezoelectric tube surrounding the fluid medium to create a time-varying density and index of refraction profile in the lens's fluid, which modulates its optical power and thereby the focal length or effective focus position of the optical system. A TAG lens may be used to periodically sweep a range of focal lengths at a resonant frequency of up to several hundred kHz, i.e., at a high speed. Such a lens may be understood in greater detail by the teachings of the article, "High speed varifocal imaging with a tunable acoustic gradient index of refraction lens" (*Optics Letters*, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 kHz.

Such VFL systems provide various advantages by being able to change effective focus positions at a very high rate, and calibration is important for ensuring the accuracy of such systems, in particular for certain types of operations (e.g., metrology grade points from focus operations, etc.). A system and method that can provide improvements over existing calibration techniques (e.g., in terms of ease of use, accuracy, and/or repeatability, etc.) for calibrating such VFL systems would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method is provided for utilizing a focus state calibration object for determining calibration data for a variable focal length (VFL) lens system. In various implementations, the VFL lens system includes a VFL lens, a VFL lens controller, a camera, an objective lens and an exposure time controller. In various implementations, the VFL lens may be a tunable acoustic gradient index of refraction (TAG) lens. The VFL lens controller controls a drive signal of the VFL lens to periodically modulate optical power of the VFL lens over a range of optical powers that occur at respective phase timings within the periodic modulation. The camera (e.g., including a detector) receives light transmitted along an imaging optical path through the VFL lens during an image exposure, and provides a corresponding camera image. The objective lens inputs image light arising from at least one of a workpiece or a calibration object during an image exposure and transmits the image light along the imaging optical path through the VFL lens and to the camera during the image exposure, to provide at least one of a workpiece image or a calibration object image in a corresponding camera image. An effective focus position in front of the objective lens during an image exposure corresponds to the optical power of the VFL lens during that image exposure. The exposure time controller is configured to control an image exposure timing used for a camera image.

In various implementations, the calibration object includes a planar tilted pattern surface on which a set of focus state reference regions (FSRRs) are distributed. The FSRRs have known geometric relationships relative to the planar tilted pattern surface. For example, in an implementation where the planar tilted pattern surface comprises a grating, and for which the FSRRs correspond to features of the gratings (e.g., grating lines/edges), the known geometric relationships may correspond to the grating having a known alignment relative to the plane of the planar tilted pattern surface and/or each grating line/edge having a known constant height across the planar tilted pattern surface and/or other known geometric relationships of the grating lines/edges relative to the planar tilted pattern surface. The FSRRs also have known region relationships relative to one another. For example, for a grating, the known region relationships may correspond to the grating having a known grating pitch and/or the grating lines/edges having known spacings relative to one another and/or other known region relationships of the grating lines/edges relative to one another. When the calibration object is arranged in a calibration object imaging configuration relative to the VFL lens system, the FSRRs are fixed at different respective effective focus positions relative to the objective lens, and have respective reference region image locations (RRILs) in calibration object images.

In various implementations, the method for utilizing the calibration object for determining calibration data includes acquiring a plurality of camera images (e.g., an image stack) at different phase timings of the periodic modulation. In various implementations, the acquiring of each camera image includes outputting source light to the calibration object with the calibration object arranged in the calibration object imaging configuration, and receiving a camera image from the camera. In various implementations, calibration object image light is transmitted along the imaging optical path to pass through the VFL lens and to the camera during a calibration object image exposure, to provide a calibration object image in the camera image. After the plurality of camera images are acquired, calibration data is determined based at least in part on analyzing the plurality of camera images, wherein the calibration data indicates respective phase timings of the periodic modulation that correspond to respective effective focus positions.

In various implementations, the determining of the calibration data may include performing an alignment process which comprises utilizing an alignment image and at least one of the known region relationships or the known geometric relationships to at least one of determine or compensate for an alignment of the calibration object relative to the VFL lens system. In various implementations the alignment image may be at least one of: a camera image of the plurality of camera images; an extended depth of field (EDOF) image of the calibration object; or an off VFL camera image of the calibration object. In various implementations, the utilizing of the alignment image comprises analyzing the alignment image to determine a synthetic frequency which indicates the alignment of the calibration object relative to the VFL lens system. In various implementations, the synthetic frequency is determined by processing a 2D Fourier transform of the alignment image. In various implementations, the alignment process may include: determining an alignment of the calibration object which corresponds to a rotation angle of the calibration object relative to the VFL lens system; and compensating for the alignment of the calibration object relative to the VFL lens system by rotating at least one image by the rotation angle before further processing of the at least one image.

In various implementations, the determining of the calibration data may include analyzing an off VFL camera image of the calibration object to determine a representative value which is referenced to corresponding values of the plurality of images and which corresponds to a working distance from the objective lens. In various implementations, the off VFL camera image is acquired when the VFL lens is in a state where the optical power of the VFL lens is not being modulated and the VFL lens provides no lensing effect. In various implementations, an interpolated value between two corresponding values of the plurality of images may be determined which matches the representative value of the off VFL camera image and which is designated as corresponding to the working distance. In various implementations, the representative value may be a pixel position value that is determined at least in part by performing a line scan or other processing of the off VFL camera image.

In various implementations, the determining of the calibration data may include utilizing an extended depth of field (EDOF) image of the calibration object to determine approximate positions of each of the FSRRs. In various implementations, the approximate positions may be utilized for positioning regions of interest in images for determining focus characteristic values for the FSRRs in the images.

In various implementations, the analyzing of the plurality of camera images may include determining focus characteristic values for each FSRR in the camera images, in order to determine a phase timing of a peak focus characteristic value for each FSRR. In various implementations, the determined focus characteristic value for each FSRR may include a quantitative contrast metric value for the FSRR. In various implementations, the analyzing of the plurality of camera images may further include determining an effective focus position of each FSRR. In various implementations, the determining of the effective focus position of each of the FSRRs may include determining a pixel location with sub-pixel accuracy of each of the FSRRs in one or more of the camera images and determining the effective focus position of the FSRR based on the determined pixel location and known physical characteristics of the calibration object and the VFL lens system, including at least the tilt angle of the planar tilted pattern surface, the magnification of the objective lens, and the pixel size.

In various implementations, the determining of the calibration data may include combining data including the determined phase timings corresponding to the peak focus characteristic values of each FSRR and the determined effective focus position of each FSRR, wherein the combined data indicates phase timings as corresponding to effective focus positions for the VFL lens system. In various implementations, an equation (e.g., a sinusoid fitted equation) may be determined as fitted to the combined data, and the equation may be utilized to determine phase timings corresponding to equally spaced effective focus positions within the range of modulation of the VFL lens. The determined phase timings corresponding to the equally spaced effective focus positions may be stored as at least part of the calibration data that indicates respective phase timings of the periodic modulation that correspond to respective effective focus positions for the VFL lens system.

In various implementations, the calibration object may include a reflective surface that is located below the planar tilted pattern surface (e.g., and that is nominally orthogonal to the optical axis of the workpiece imaging optical path when the calibration object is arranged in the calibration object imaging configuration relative to the VFL lens system). In various implementations, source light that passes through the planar tilted pattern surface, and is reflected by the reflective surface to pass back through the planar tilted pattern surface as calibration object image light, is transmitted along the workpiece imaging optical path.

In various implementations, additional calibration objects may be provided as part of a set of calibration objects. Each calibration object of the set may have a planar tilted pattern surface with a different amount of tilt, and each calibration object of the set may correspond to a different objective lens with a different magnification. When a calibration is performed of the VFL lens system, a calibration object may be utilized from the set that corresponds to the objective lens that is utilized during the calibration.

BRIEF DESCRIPTION OF THE SEVERAL VIEWS OF THE DRAWINGS

FIGS. 5A and 5B are diagrams illustrating different tilt angles for calibration objects such as the calibration object of FIGS. 4A and 4B for use in combination with different objective lenses that provide different magnifications.

FIG. 9 is a diagram illustrating a determination of a rotation angle that may be utilized to compensate for a rotation of a calibration object.

DETAILED DESCRIPTION

Figure 1:
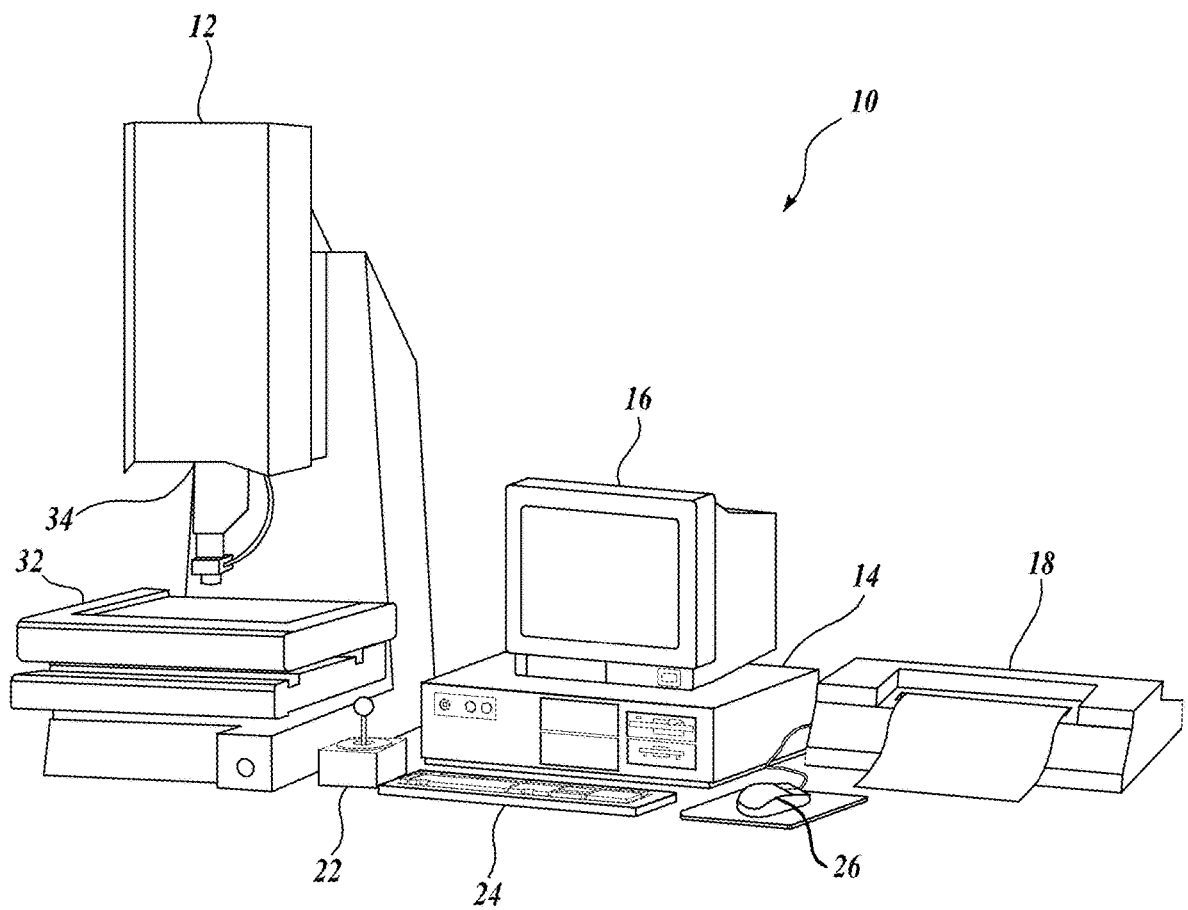
FIG. 1 is a diagram showing various typical components of a general-purpose precision machine vision inspection system.

FIG. 1 is a block diagram of one exemplary machine vision inspection system 10 usable as or including a VFL lens system (also referenced herein as an imaging system) in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of the machine vision inspection system 10 are also described in commonly assigned U.S. Pat. Nos. 7,454,053; 7,324,682; 8,111,905; and 8,111,938, each of which is hereby incorporated herein by reference in its entirety.

Figure 2:
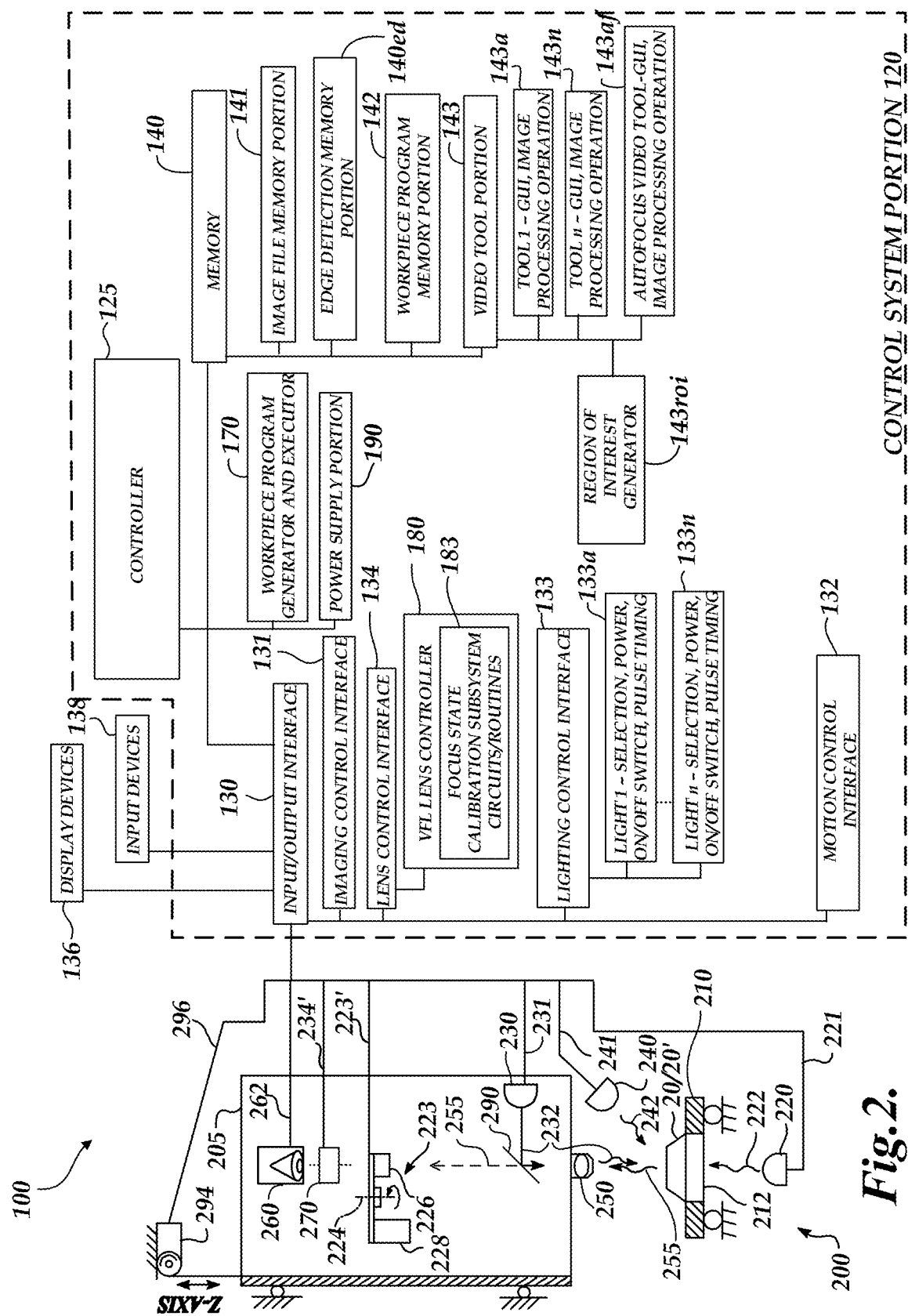
FIG. 2 is a block diagram of a control system portion and a vision components portion of a machine vision inspection system similar to that of FIG. 1 and including certain features disclosed herein.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. The workpiece stage 210 is controllably movable along X and Y axes that lie in a plane that is generally parallel to the surface of the stage where a workpiece 20' or calibration object 20 may be positioned.

The optical assembly portion 205 includes a camera system 260, an interchangeable objective lens 250 and a variable focal length (VFL) lens 270 (e.g., a TAG lens in various exemplary implementations). In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis that is generally orthogonal to the X and Y axes by using a controllable motor 294 that drives an actuator to move the optical assembly portion 205 along the Z axis to change the focus of the image of a workpiece 20' or a calibration object 20. The controllable motor 294 is connected to an input/output interface 130 via a signal line 296. As will be described in more detail below, to change the focus of the image over a smaller range, or as an alternative to moving the optical assembly portion 205, the VFL (e.g., TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180 according to various principles disclosed herein, as described in greater detail below. A workpiece 20' or a calibration object 20 may be placed on the workpiece stage 210. The workpiece stage 210 may be controlled to move relative to the optical assembly portion 205, such that the field of view of the interchangeable objective lens 250 moves between locations on a calibration object 20 or a workpiece 20', and/or among a plurality of workpieces 20', etc.

One or more of a stage light source 220, a coaxial light source 230, and a surface light source 240 (e.g., a ring light) may emit source light 222, 232, and/or 242, respectively, to illuminate a calibration object 20, a workpiece 20' or workpieces 20'. For example, during an image exposure, the coaxial light source 230 may emit source light 232 along a path including a beam splitter 290 (e.g., a partial mirror). The source light 232 is reflected or transmitted as image light 255, and the image light used for imaging passes through the interchangeable objective lens 250, the turret lens assembly 223 and the VFL lens 270, and is gathered by the camera system 260. A workpiece or calibration object image exposure which includes the image of the workpiece(s) 20' or calibration object 20, is captured by the camera system 260, and is output on a signal line 262 to the control system portion 120.

Various light sources (e.g., the light sources 220, 230, 240) may be connected to a lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL lens 270, and including focus state calibration subsystem circuits/routines 183 according to principles disclosed herein, as described in greater detail below with reference to similar or identical elements 380 and 383 shown in FIG. 3. In some implementations, the lens control interface 134 and the VFL lens controller 180 may be merged and/or indistinguishable.

Figure 3:
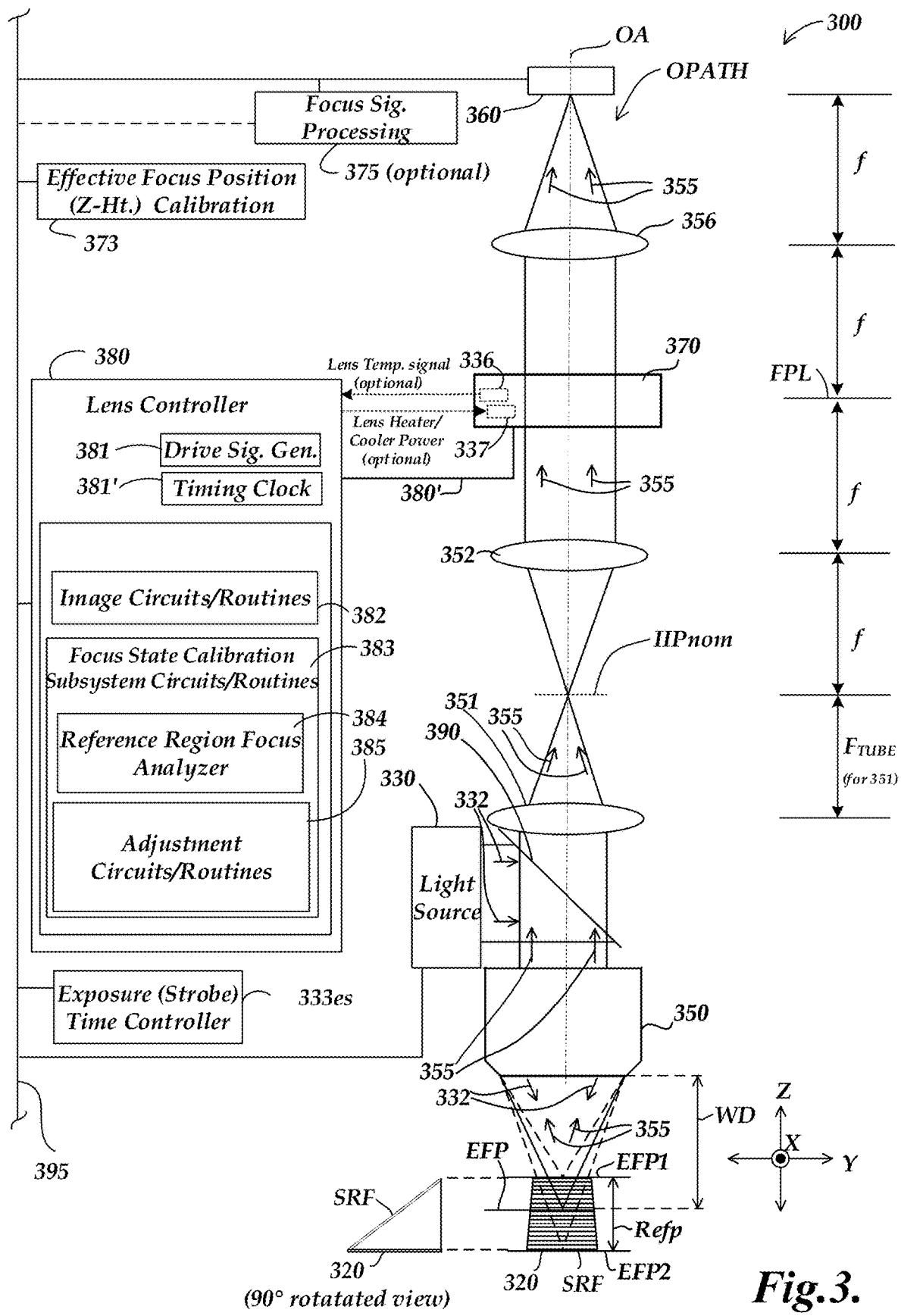
FIG. 3 is a schematic diagram of a VFL lens system that may be adapted to a precision non-contact metrology system such as a machine vision inspection system, and including certain features disclosed herein.

The lighting control interface 133 may include lighting control elements 133a-133n, that control, for example, the selection, power, on/off switch, and strobe pulse timing, if applicable, for the various corresponding light sources of the machine vision inspection system 100. In some implementations, an exposure (strobe) time controller 333es as shown in FIG. 3 may provide strobe timing signals to one or more of the lighting control elements 133a-133n, such that they provide an image exposure strobe timing that is synchronized with a desired phase time of the VFL lens focus position modulation (e.g., in accordance with certain stored calibration data), and as described in greater detail below. In some implementations, the exposure (strobe) time controller 333es and one or more of the lighting control elements 133a-133n may be merged and/or indistinguishable.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height (i.e., effective focus position (Z-height)) measurement operations. In various implementations, the autofocus video tool 143af may additionally include a high-speed focus height tool that may be utilized to measure focus heights with high speed using hardware illustrated in FIG. 3, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. In some implementations, such techniques may be utilized to create a part program for analyzing a calibration object and/or calibration object image(s), to provide functions and operations described in more detail below.

FIG. 3 is a schematic diagram of a VFL lens system 300 (also referred to as imaging system 300) that includes a VFL lens 370 (e.g., a TAG lens) and which may be calibrated according to principles disclosed herein. The VFL lens system 300 may be adapted to a machine vision system or configured as a standalone system, and may be operated according to principles disclosed herein. It will be appreciated that certain numbered components 3XX of FIG. 3 may correspond to and/or provide similar operations or functions as similarly numbered components 2XX of FIG. 2, and may be similarly understood unless otherwise indicated.

As will be described in more detail below, an imaging optical path OPATH (also called a workpiece imaging optical path, or calibration object imaging optical path, herein) comprises various optical components arranged along a path that conveys image light 355 from the workpiece 320' or calibration object 320 to the camera 360. The image light is generally conveyed along the direction of their optical axes OA. In the implementation shown in FIG. 3, all the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 320' or calibration object 320 using a camera (e.g., the camera 360) according to known principles.

In the illustrated implementation, the imaging optical path OPATH includes the VFL lens 370 (which may be included in a 4f imaging configuration) and is utilized at least in part for imaging a surface of a workpiece 320' during a workpiece image exposure or a surface of a calibration object 320 during a calibration object image exposure. As will be described in more detail below, in accordance with principles disclosed herein, calibration object image light may be transmitted along the imaging optical path OPATH to pass through the VFL lens 370 to form one or more calibration object image exposures, which may be analyzed as part of a calibration process for the VFL lens system 300.

As shown in FIG. 3, the VFL lens system 300 includes a light source 330, an exposure (strobe) time controller 333es, an objective lens 350, a tube lens 351, a relay lens 352, a VFL (TAG) lens 370, a relay lens 356, a lens controller 380, a camera 360, an effective focus position (Z-height) calibration portion 373 and a workpiece focus signal processing portion 375 (optional). In various implementations, the various components may be interconnected by direct connections or one or more data/control busses (e.g., a system signal and control bus 395) and/or application programming interfaces, etc.

As will be described in more detail below, in various implementations, the VFL lens controller 380 may control a drive signal of the VFL lens 370 to periodically modulate optical power of the VFL lens 370 over a range of optical powers that occur at respective phase timings within the periodic modulation. The camera 360 (e.g., including an imaging detector) receives light transmitted along an imaging optical path OPATH through the VFL lens 370 during an image exposure and provides a corresponding camera image. The objective lens 350 inputs image light arising from at least one of a workpiece 320' or a calibration object 320 during an image exposure, and transmits the image light along the imaging optical path OPATH through the VFL lens 370 and to the camera 360 during the image exposure, to provide at least one of a workpiece image or a calibration object image in a corresponding camera image. An effective focus position EFP in front of the objective lens 350 during an image exposure corresponds to the optical power of the VFL lens 370 during that image exposure. The exposure time controller 333es is configured to control an image exposure timing used for a camera image.

As will further be described in more detail below, in various implementations, a method for calibrating the VFL lens system 300 may include acquiring a plurality of camera images (e.g., an image stack) at different phase timings of the periodic modulation. In various implementations, the acquiring of each camera image may include outputting source light 332 to the calibration object 320 with the calibration object 320 arranged in a calibration object imaging configuration (e.g., within the field of view of the objective lens 350) and receiving a camera image from the camera 360. In various implementations, calibration object image light 355 may be transmitted along the imaging optical path OPATH to pass through the VFL lens 370 and to the camera 360 during a calibration object image exposure to provide a calibration object image in the camera image. In various implementations, after the plurality of camera images are acquired, calibration data may be determined based at least in part on analyzing the plurality of camera images, wherein the calibration data indicates respective phase timings of the periodic modulation which correspond to respective effective focus positions EFP.

With respect to the general configuration shown in FIG. 3, the light source 330 may be a "coaxial" or other light source configured to emit the source light 332 (e.g., with strobed or continuous illumination) along a path including a beam splitter 390 (e.g., a partially reflecting mirror as part of a beam splitter) and through the objective lens 350 to a surface of a workpiece 320' or calibration object 320, wherein the objective lens 350 receives the image light 355 (e.g., workpiece light or calibration object light) that is focused at an effective focus position EFP proximate to the workpiece 320' or calibration object 320, and outputs the image light 355 to the tube lens 351. The tube lens 351 receives the image light 355 and outputs it to the relay lens 352. In other implementations, analogous light sources may illuminate the field of view in a non-coaxial manner; for example, a ring light source may illuminate the field of view.

In various implementations, the objective lens 350 may be an interchangeable objective lens, and the tube lens 351 may be included as part of a turret lens assembly (e.g., similar to the interchangeable objective lens 250 and the turret lens assembly 223 of FIG. 2). In the implementation shown in FIG. 3, image light 355 arising from a nominal focal plane of the objective lens 350 is focused by the tube lens 351 to form an intermediate image at a nominal intermediate image plane IIPnom. When the VFL (TAG) lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the VFL (TAG) lens 370. The VFL (TAG) lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320') provided during a workpiece image exposure or a calibration object image (e.g., of a region of the calibration object 320) provided during a calibration object image exposure. In some implementations, an image exposure (e.g., a workpiece image exposure or a calibration object image exposure) may be limited or controlled by a strobe timing of the light source 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the VFL (TAG) lens 370 (e.g., which may be a low numerical aperture (NA) device) at the Fourier plane of the objective lens 350. This configuration may maintain the telecentricity at the workpiece 320' or calibration object 320, and may minimize scale change and image distortion (e.g., including providing constant magnification for each effective focus position (Z-height) of the workpiece 320' or calibration object 320). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', imaging circuits/routines 382, and focus state calibration subsystem circuits/routines 383. The drive signal generator portion 381 may operate (e.g., in conjunction with the timing clock 381') to provide a periodic drive signal to the high speed VFL (TAG) lens 370 via a signal line 380'. In various implementations, the VFL lens system (or imaging system) 300 may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320' or a calibration object 320 in a manner synchronized with a desired phase timing of the VFL lens 370, as well as controlling, monitoring and adjusting the driving and response of the VFL lens 370. In various implementations, the image circuits/routines 382 perform standard imaging operations for the optical system, synchronized with the phase timing of the VFL lens 370, as known in the art and as described in the incorporated references. As will be described in more detail below, in various implementations, the focus state calibration subsystem circuits/routines 383 may perform focus state calibration in accordance with principles disclosed herein.

The focus state calibration subsystem circuits/routines 383 include a reference region focus analyzer 384 and optional adjustment circuits/routines 385. In various implementations, the reference region focus analyzer 384 may perform functions such as inputting calibration object images (e.g., as included in camera images) and calling certain video tools (e.g., a known type of autofocus video tool, or multi-region or multi-point autofocus video tool, or the like) or other focus analysis routines to determine one or more focus characteristic values (e.g., a quantitative contrast and/or focus metric value) for focus state reference regions (FSRRs) in the calibration object images used for focus state calibration, etc.

In various implementations, calibration data determined through such processes may be stored and utilized for subsequent measurement operations by the system. In various implementations, the determined calibration data and/or other factors may optionally be used as part of a process for performing adjustments to the system, after which, in some instances, the calibration data may again be determined. For example, in one implementation the optional adjustment circuits/routines 385 may input the determined focus characteristic results/values and/or other determined calibration data from the reference region focus analyzer 384 or other determined results/values/data, and may compare the determined results/values/data to corresponding stored results/values/data, in order to determine whether certain types of adjustments will be made to the system. As will be described in more detail below, in various implementations, adjustments may include (but are not limited to) adjusting an amplitude for driving the VFL lens 370 (e.g., for adjusting its optical power range and the resulting effective focus position range), a phase timing adjustment (e.g., for adjusting the phase timing used to provide particular effective focus positions (Z-heights)), a VFL lens temperature adjustment, etc. In various implementations, such adjustments may be implemented through changes to the control signals of the drive signal generator portion 381, timing clock 381', and/or lens heater/cooler 337, etc., as will be described in more detail below. In various implementations, the focus state calibration subsystem circuits/routines 383 may in some instances repeatedly perform operations to iteratively analyze and adjust the system until the optical power range of the VFL lens and/or the resulting effective focus position range is at desired levels (e.g., within a desired tolerance relative to certain stored results/values/data). Once such adjustment processes are completed, calibration data corresponding to the current state of the system may be stored and utilized for subsequent measurement operations by the system.

In various instances, drift in the operating characteristics of the VFL lens may arise due to unwanted temperature variations. As shown in FIG. 3, in various implementations, the imaging system 300 may optionally include the lens heater/cooler 337 associated with the VFL lens 370. The lens heater/cooler 337 may be configured to input an amount of heat energy into the VFL lens 370 and/or perform cooling functions to facilitate heating and/or cooling of the VFL lens 370 according to some implementations and/or operating conditions. In addition, in various implementations, a VFL lens monitoring signal may be provided by a temperature sensor 336 associated with the VFL lens 370 to monitor an operating temperature of the VFL lens 370.

Figure 7:
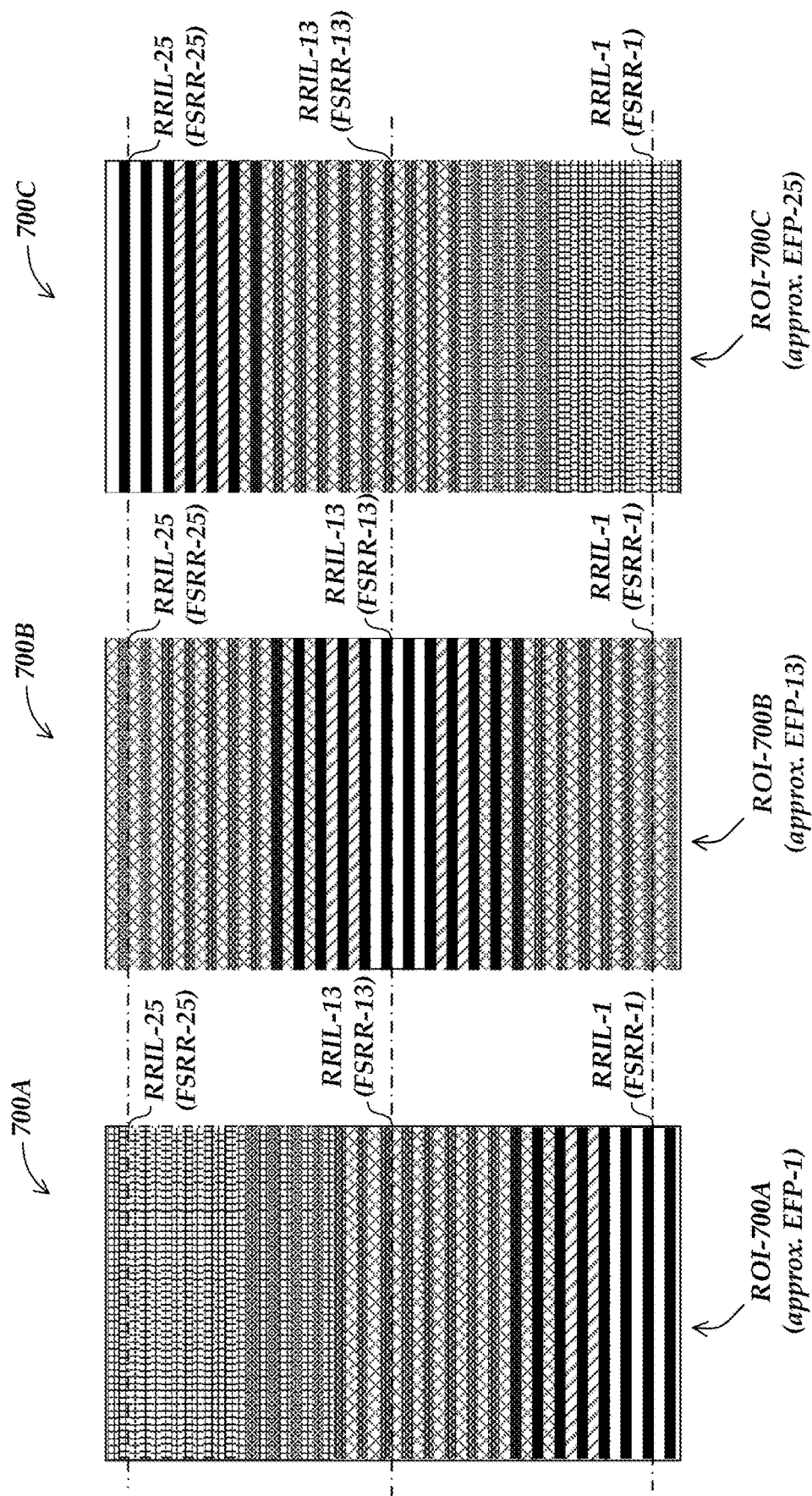
FIGS. 7A, 7B and 7C are diagrams representing three camera images that include images of the calibration object of FIG. 6 in three different focus states.

As will be described in more detail below with respect to FIGS. 7A-7C, the camera 360 may provide calibration object images (e.g., such as the exemplary images 700A-700C) exposed during corresponding phase timings of the periodic modulation of the VFL lens 370 and the resulting effective focus position of the imaging system 300 to support focus state calibration operations. As explained in greater detail below, focus characteristic values for members of a set of focus state reference regions included in calibration object images exposed using particular known phase timings (e.g., such as the exemplary images 700A-700C) are related to an optical power of the VFL lens 370 and the resulting effective focus position of the imaging system 300 during the corresponding phase timings.

As will be described in more detail below, in various implementations, the calibration object 320 may be referenced as a focus state (FS) calibration object 320, and may include a planar tilted pattern surface SRF (e.g., as illustrated at the bottom of FIG. 3 next to the calibration object 320 in the 90-degree rotated view of the calibration object 320 with the planar tilted pattern surface SRF). As will be described in more detail below, in various implementations, a set of focus state reference regions (FSRRs) may be distributed on the planar tilted pattern surface SRF (e.g., as part of a contrast pattern). The FSRRs may have respective known relative reference region image locations (RRILs) in calibration object images and that are fixed at a different respective relative reference region focus distances or positions. As a result, a camera image that includes a best-focus image of a particular FSRR may define a system focus reference state associated with that particular FSRR. In various implementations, that defined system focus reference state may comprise a particular VFL optical power and/or a particular effective focus position associated with that particular FSRR, etc. (e.g., as described further below).

In various implementations, when the calibration object 320 is to be imaged, the calibration object 320 may be arranged in a calibration object imaging configuration. In various implementations, the calibration object imaging configuration may include the calibration object 320 being located on a stage (e.g., 210) of the system or otherwise in a field of view of the objective lens 350. The calibration object 320 may be in a position wherein camera images that are acquired include calibration object images that include the tilted surface of the calibration object 320 so that focus characteristic values can be determined for FSRRs on the tilted surface of the calibration object 320, as will be described in more detail below.

In various implementations, when the calibration object 320 is in the calibration object imaging configuration and is being imaged, the VFL lens 370 receives and outputs the image light 355 of the calibration object image, for which the image focus location (e.g., at the camera 360) is periodically altered by the periodic optical power variation associated with the operation of the VFL lens 370. When different respective FSRRs on the calibration object 320 are located at different respective distances (e.g., from the objective lens 350), they will thus be focused in respective images acquired at different respective times during the periodic optical power variation of the VFL lens 370. Thus, the calibration object 320 (e.g., with certain known characteristics regarding the relative heights of the FSRRs) may be utilized as part of a calibration process as disclosed herein, as will be described in greater detail below.

With respect to the general operations of the VFL lens 370, in various implementations as described above, the lens controller 380 may rapidly adjust or modulate its optical power periodically, to achieve a high-speed VFL lens capable of a periodic modulation (i.e., at a VFL lens resonant frequency) of 250 kHz, or 70 kHz, or 30 kHz, or the like. As shown in FIG. 3, by using the periodic modulation of a signal to drive the VFL lens 370, the effective focus position EFP of the imaging system 300 (that is, the focus position in front of the objective lens 350) may be rapidly moved within a range Refp (e.g., an autofocus search range) bound by an effective focus position EFP1 (or EFPmax) corresponding to a maximum optical power of the VFL lens 370 in combination with the objective lens 350, and an effective focus position EFP2 (or EFPmin) corresponding to a maximum negative optical power of the VFL lens 370 in combination with the objective lens 350. In various implementations, the effective focus positions EFP1 and EFP2 may approximately correspond to phase timings of 90 degrees and 270 degrees, as will be described in more detail below. For purposes of discussion, the middle of the range Refp may be designated as EFPnom, and may correspond to zero optical power of the VFL lens 370 in combination with the nominal optical power of the objective lens 350. According to this description, EFPnom may approximately correspond to the nominal focal length of the objective lens 350 in some implementations (e.g., which may correspond to a working distance WD of the objective lens 350).

In one implementation, the optional focus signal processing portion 375 may input data from the camera 360 and may provide data or signals that are utilized to determine when an imaged surface region (e.g., of a workpiece 320' or calibration object 320) is at an effective focus position. For example, a group of images acquired by the camera 360 at different effective focus positions (Z-heights), such as part of an image stack, may be analyzed using a known "maximum contrast" or "best-focus image" analysis to determine when an imaged surface region of a workpiece 320' or calibration object 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (sweeping of multiple effective focus positions) of the VFL lens 370 (e.g., a TAG lens), and determine an image and/or image timing at which a target feature (e.g., of a workpiece or a calibration object) is best-focused. In various implementations, portions, or all, of the focus signal processing portion 375 and the reference region focus analyzer 384 may be merged and/or indistinguishable. Alternatively, in certain implementations the focus signal processing portion 375 may be utilized primarily for processing workpiece images, while the reference region focus analyzer 384 may be utilized primarily for processing calibration object images.

In some implementations, the focus signal processing portion 375 may determine a phase timing corresponding to a best-focus (e.g., of a workpiece feature or a calibration object feature) and output that "best-focus" phase timing value to the effective focus position calibration portion 373 (e.g., which may store calibration data determined by calibration processes such as those disclosed herein). The effective focus position calibration portion 373 may provide effective focus position (Z-height) calibration data that relates respective effective focus positions (Z-heights) to respective "best-focus" phase timings within a period of a standard imaging resonant frequency of the VFL lens 370, wherein in some instances the calibration data may generally correspond to operating the VFL lens 370 according to a standard imaging drive control configuration or reference state.

Generally speaking, the effective focus position calibration portion 373 comprises recorded effective focus position (Z-height) calibration data (e.g., as determined by calibration processes such as those disclosed herein). As such, its representation in FIG. 3 as a separate element is intended to be a schematic representation only, and not limiting. In various implementations, the associated recorded effective focus position (Z-height) calibration data may be merged with and/or indistinguishable from the lens controller 380, the workpiece focus signal processing portion 375, or a host computer system connected to the system signal and control bus 395, etc.

In various implementations, the exposure (strobe) time controller 333es controls an image exposure time of the imaging system 300 (e.g., relative to a phase timing of the periodically modulated effective focus position). More specifically, in some implementations, during an image exposure, the exposure (strobe) time controller 333es (e.g., using the effective focus position (Z-height) calibration data available in the effective focus position calibration portion 373), may control the light source 330 to strobe at a respective controlled time. For example, the exposure (strobe) time controller 333es may control the strobe light source to strobe at a respective phase timing within a period of a standard imaging resonant frequency of the VFL lens 370, so as to acquire an image having a particular effective focus position within the sweeping (periodic modulation) range of the VFL lens 370. In other implementations, the exposure time controller 333es may control a fast electronic camera shutter of the camera 360 to acquire an image at a respective controlled time and/or its associated effective focus position. In some implementations, the exposure (strobe) time controller 333es may be merged with or indistinguishable from the camera 360. It will be appreciated that the operations of the exposure time controller 333es and other features and elements outlined above may be implemented to govern workpiece image acquisitions, calibration object image acquisitions, or both, in various implementations. As will be described in more detail below with respect to FIGS. 7A-7C, in certain specific example implementations, calibration object image exposures may thus be controlled to correspond to specified phase timings related to the structure of the calibration object (e.g., particular phase timings that provide images in which the FSRRs of the calibration object 320 are in different levels of focus), as may be utilized for determining calibration data for the VFL lens system.

Figure 4B:
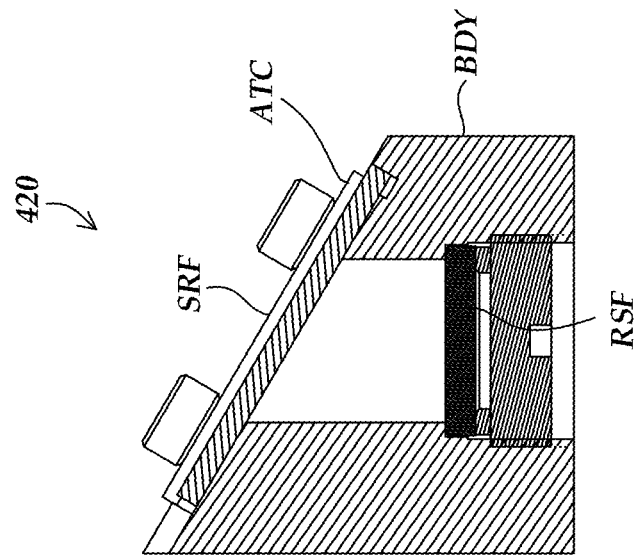
FIGS. 4A and 4B are diagrams showing a first exemplary implementation of a focus state calibration object usable in accordance with principles disclosed herein.
Figure 4A:
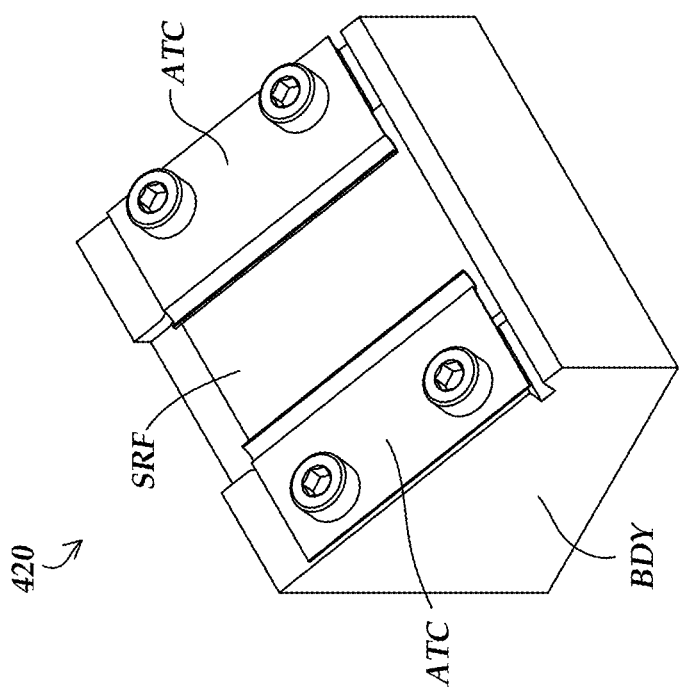

FIGS. 4A and 4B are diagrams showing a first exemplary implementation of a focus state (FS) calibration object 420 usable in accordance with principles disclosed herein. As shown in FIG. 4A, the calibration object 420 includes a planar tilted pattern surface SRF, a supporting body BDY, and attachment members ATC (e.g., for attaching the planar tilted pattern surface SRF to the body BDY). As will be described in more detail below with respect to FIG. 6, in various implementations, a set of FSRRs may be distributed on the planar tilted pattern surface SRF (e.g., as part of a contrast pattern). For example, in various implementations, the planar tilted pattern surface SRF may include a grating for which the contrast pattern may include grating lines (e.g., as illustrated in the example of FIG. 4A).

As illustrated in FIG. 4B, the calibration object 420 further includes a reflective surface RSF (e.g., a mirror, etc.) located below the planar tilted pattern surface SRF. In various implementations, when the calibration object 420 is placed/arranged in a calibration object imaging configuration relative to a VFL lens system, the reflective surface RSF may be nominally orthogonal to an optical axis of an objective lens and/or of an imaging optical path. In various implementations, when source light (e.g., source light 332) from the VFL lens system passes through the planar tilted pattern surface SRF (e.g., a grating), the light may be reflected back by the reflective surface RSF to pass back through the planar tilted pattern surface SRF as at least part of the calibration object image light that is transmitted along the imaging optical path of the VFL lens system. In various implementations, such features may be particularly desirable for calibration objects with planar tilted pattern surfaces with certain relatively high tilt angles (e.g., tilt angles above 10 degrees, or above 15 degrees, etc.). More specifically, in certain implementations, planar tilted pattern surfaces with certain tilt angles may not reflect a desired amount of light back along an imaging optical path of the VFL lens system, for which the light reflected back by the reflective surface RSF which passes back through the planar tilted pattern surface may increase the image light that is directed along the imaging optical path (e.g., so as to improve the imaging of the calibration object 420, etc.).

FIG. 5 is a diagram illustrating different tilt angles (i.e., of a planar tilted pattern surface) for calibration objects such as the calibration object of FIGS. 4A and 4B. In various implementations, such different calibration objects may be provided as part of a set of calibration objects that are for use with a set of interchangeable objective lenses of various magnifications (e.g., an example set of objective lenses ranging from 1× to 50× magnification) of a VFL lens system. As will be described in more detail below, each calibration object of the set of calibration objects has a planar tilted pattern surface with a different amount of tilt, and each calibration object of the set of calibration objects corresponds to a different objective lens with a different magnification. In various implementations, when a calibration is performed of the VFL lens system, a calibration object may be utilized from the set that corresponds to the objective lens that is utilized during the calibration.

In various implementations, the tilt angle for each calibration object may be designed to enable a full scan of a VFL range (e.g., with +1 diopter) for use with a corresponding objective lens with a specified magnification. More specifically, utilization of an objective lens with a larger magnification results in increased resolution but, correspondingly, a smaller overall Z-scan range, for which the tilt angle of a corresponding calibration object may correspondingly be smaller (e.g., as indicated by the tilt angles and other values illustrated in the table of FIG. 5B). As some specific example values that are indicated by the table of FIG. 5B, for a configuration with an objective lens with a magnification of 1×, an X field of view (FOV) of 6.784 mm, a Y FOV of 5.427 mm, and a scan range of 20.000 mm, a tilt angle of 71.3 degrees may be utilized for a corresponding calibration object. At the other end of the range, for a configuration with an objective lens with a magnification of 50×, an X FOV of 0.1357 mm, a Y FOV of 0.1085 mm, and a scan range of 0.008 mm, a tilt angle of 3.4 degrees may be utilized for a corresponding calibration object.

In various implementations, rather than having a separate calibration object provided for use with each objective lens, a single calibration object may be provided for use with two or more specified objective lenses. In one such implementation, the planar tilted pattern surface may have a tilt angle that is adjustable (e.g., may be adjusted between different angles for use with the different objective lenses, such as those indicated in FIG. 5B). In various implementations, a set of different calibration objects for use with different objective lenses may be of different sizes and/or may have contrast patterns and/or corresponding focus state reference regions with different pitches, etc. For example, a calibration object for use with a 50× objective lens with a FOV of 0.1357 mm by 0.1085 mm may have a smaller planar tilted pattern surface and/or have a finer pitch of the contrast pattern and/or corresponding FSRRs (e.g., a smaller grating with a finer pitch of grating lines) than a calibration object for use with a 1× objective lens with a FOV of 6.784 mm by 5.427 mm.

Figure 6:
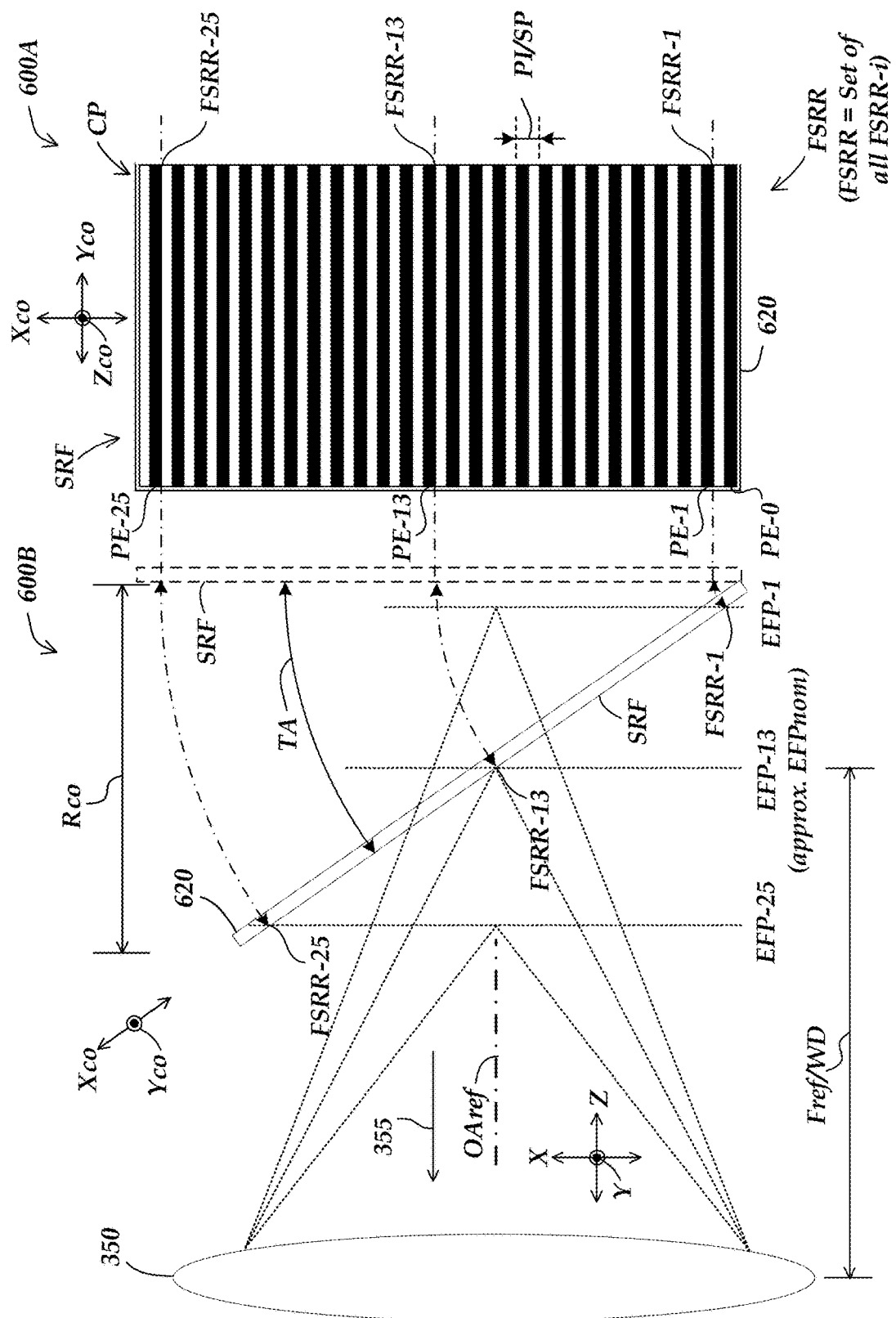
FIG. 6 is a diagram showing a second exemplary implementation of a calibration object usable in accordance with principles disclosed herein and including focus state reference regions (FSRRs).

FIG. 6 includes two related diagrams illustrating a second exemplary implementation of a calibration object 620 usable in accordance with principles disclosed herein. A surface SRF of the calibration object 620 is shown in a plan view in diagram 600A. The diagram 600B is a side view diagram, wherein the surface SFR of the calibration object 620 is shown tilted at a tilt angle TA, according to principles disclosed herein. As shown in the diagram 600A, the surface SRF of the calibration object 620 is a planar "pattern surface" that includes a contrast pattern CP along the surface, and which may have a specified number and/or configuration of pattern elements PE (e.g., pattern elements PE-0 to PE-25). In one implementation, the planar pattern surface SRF may comprise a grating, for which the contrast pattern CP may be that of the grating elements, and for which the pattern elements PE-0 to PE-25 may correspond to grating lines as distributed on the grating. In various implementations, it may be desirable for the contrast pattern to include high-contrast pattern elements PE arranged at a high spatial frequency. As shown in FIG. 6, various FSRRs of the contrast pattern CP are arranged along surface SRF (e.g., see representative regions FSRR-1, FSRR-13 and FSRR-25) such that they are at different effective focus positions relative to the objective lens 350, with the planar pattern surface SRF tilted at the tilt angle TA.

FSRRs as referred to herein may be considered to be any region on a calibration object 620 at a reference region image location (RRIL) in calibration object images, as may be known by design and/or calibration. In the particular example of FIG. 6, where the planar pattern surface comprises a grating, and for which the pattern elements PE-0 to PE-25 correspond to grating lines, the FSRRs may in one implementation correspond to edges (i.e., bottom edges) of the grating lines. In such an implementation, FSRR-1 to FSRR-25 may correspond to the bottom edges of the grating lines PE-1 to PE-25 (e.g., for which FSRR-1 corresponds to the bottom edge of grating line PE-1, FSRR-13 corresponds to the bottom edge of grating line PE-13, and FSRR-25 corresponds to the bottom edge of grating line PE-25). While in this particular example FSRRs are designated as corresponding to the bottom edges of grating lines, it will be appreciated that, in various implementations, FSRRs may correspond to any type, dimension, etc., of contrast pattern element, feature, etc. (e.g., as are each located at a distinct determinable RRIL in a calibration object image, etc.).

In various implementations, the FSRRs have known geometric relationships relative to the planar tilted pattern surface SRF. For example, in an implementation where the planar tilted pattern surface comprises a grating, the known geometric relationships may correspond to the grating having a known alignment relative to the plane of the planar tilted pattern surface SRF, and/or each FSRR being at a known constant height across the planar tilted pattern surface SRF and/or other known geometric relationships of the FSRRs relative to the planar tilted pattern surface SRF. In various implementations, the FSRRs also have known region relationships relative to one another. For example, for a grating, the known region relationships may correspond to the grating having a known grating pitch PI, and/or the FSRRs having known spacings SP relative to one another, and/or other known region relationships of the FSRRs relative to one another. When arranged in a calibration object imaging configuration relative to the objective lens 350, the respective FSRRs are fixed at different respective reference region focus distances or effective focus positions EFP relative to the objective lens 350.

As shown in the diagram 600B, with the surface SRF of the calibration object 620 at the tilt angle TA, FSRR-1, FSRR-13 and FSRR-25 are arranged relative to the objective lens 350 at different effective focus positions EFP-1, EFP-13 and EFP-25, respectively. It will be appreciated that other respective FSRR-i have other respective effective focus positions EFP-i within a calibration object focus position range Rco. Any calibration object disclosed herein may incorporate a somewhat diffusive or scattering surface with any imaged pattern surface, to allow more robust imaging, reduced alignment requirements, and reduced unwanted reflections. A calibration object such as that disclosed herein may be utilized for calibrating an exemplary VFL lens system such as those described with reference to FIGS. 1-3, and may be imaged onto a camera 360 (e.g., a 1280×1024 pixel camera) to provide a calibration object image usable according to principles disclosed herein.

FIGS. 7A, 7B and 7C are diagrams representing three camera images 700A, 700B and 700C that include images of the calibration object 620 of FIG. 6 in three different focus states. As will be described in more detail below, as part of a calibration process, an image stack including a number of images (e.g., which, in various implementations, may number in the 10s or 100s of images, etc.) may be acquired (e.g., at equally spaced phase timings or otherwise throughout a range of the optical power modulation of the VFL lens 370). In various implementations, the images 700A, 700B and 700C may represent three example images from such an image stack (e.g., with the image 700B taken near the middle of the range, and the images 700A and 700C taken near opposite ends of the range).

In particular, the camera image 700A includes a calibration object image ROI-700A focused near an effective focus position EFP-1 where the FSRR-1 is best-focused. The camera image 700B includes a calibration object image ROI-700B focused near an effective focus position EFP-13 where FSRR-13 is best-focused, and the camera image 700C includes a calibration object image ROI-700C focused near an effective focus position EFP-25 where the FSRR-25 is best-focused. Each of the effective focus positions EFP-1, EFP-13, EFP-25, are illustrated in FIG. 6. Different degrees of image focus or blur are schematically represented in FIGS. 7A, 7B and 7C by different cross-hatch patterns. As shown, representative FSRR-1 has a reference region image location RRIL-1, FSRR-13 has a reference region image location RRIL-13, and FSRR-25 has a reference region image location RRIL-25.

As previously indicated, the image focus location or position (e.g., at the camera 360) is periodically altered by the periodic optical power variation associated with the operation of the VFL lens 370. It will be appreciated that the effective focus position EFP in the vicinity of the calibration object 620 is thus also periodically altered or swept due to the periodic optical power variation associated with the operation of the VFL lens 370. When different respective FSRRs are located at different respective effective focus positions EFPs, they will thus be best-focused at different respective times (phase times) in relation to a phase or period of the periodic optical power variation of the VFL lens 370.

Accordingly, the calibration object image ROI-700A is acquired by an image exposure (e.g., a strobe timing) near a phase timing designated Ph-1 (according to a convention used herein) which corresponds to a timing at which the FSRR-1 at RRIL-1 is best-focused at the effective focus position EFP-1. In this calibration object image ROI-700A, due to the tilt angle TA of the surface SRF of the calibration object 620 (i.e., as shown in FIG. 6) the focus of the FSRRs is illustrated as progressively degrading approximately as a function of distance away from FSRR-1 and RRIL-1, and is generally worst near FSRR-25 at RRIL-25, which is near the far end of the calibration object 620, and thus relatively far from the approximate image focus position. The degree of focus or blur for any FSRR in an image may be determined based on determining a focus characteristic value (e.g., a quantitative contrast and/or focus metric value) for that particular FSRR, according to known methods. FIGS. 7B and 7C may be understood by analogy to the previous description.

Briefly, the calibration object image ROI-700B is acquired by an image exposure near a phase timing Ph-13, which corresponds to a timing at which the FSRR-13 at RRIL-13 is best-focused at the effective focus position EFP-13. In this particular example, EFP-13 (shown in FIG. 6) is an example of a focus position near a nominal focus position EFPnom, which is designated as a nominal focus position wherein the VFL optical power is zero. Thus, EFPnom may nominally be in the middle of the focus range Rco, and may correspond to a nominal focal length Fref of the objective lens 350 (e.g., as may correspond to a working distance WD from the objective lens 350). As EFP-13 is centrally located along the calibration object 620 and the focus position range Rro, the focus of the FSRRs is illustrated as progressively degrading in each direction further away from FSRR-13 and RRIL-13, and is worst near the ends of the calibration object 620. Briefly, the calibration object image ROI-700C is acquired by an image exposure near a phase timing Ph-25, which corresponds to a timing wherein the FSRR-25 at RRIL-25 is best-focused at the effective focus position EFP-25. The focus of the FSRRs is illustrated as approximately progressively degrading in the direction away from FSRR-25 and RRIL-25, and is worst in the vicinity of FSRR-1 at RRIL-1, which is near the far end of the calibration object 620, and thus relatively far from the approximate image focus position.

As noted above, when different respective FSRRs are located at different respective effective focus position EFPs, they will thus be best-focused at different respective times (i.e., different respective phase times) in relation to a phase or period of the periodic optical power variation of the VFL lens 370. As will be described in more detail below, when an image stack is acquired (e.g., a set of images is acquired at equally spaced phase timings or otherwise throughout a range of the optical power modulation of the VFL lens 370), for a given FSRR that appears in each of the images, it will generally have a different focus characteristic value (e.g., a different quantitative contrast and/or focus metric value) for each image, with higher focus characteristic values in images that are acquired closer to the timing of when the FSRR is best focused. While such an image stack may not include an exact best-focused image of the FSRR (e.g., the timing for such a best-focused image may fall between the timings of two images of the stack), the timing for such a best-focused image may be determined by analyzing the images of the image stack in accordance with known techniques (e.g., utilizing points from focus operations and/or with analysis of focus curves, etc.). As previously indicated, the VFL lens system 300 may comprise a reference region focus analyzer 384 and/or focus signal processing portion 375 which may be configured to determine focus characteristic values (e.g., quantitative contrast and/or focus metric values) and/or other values for FSRRs in images in an image stack which may be utilized as part of such processes for determining a phase timing of when an FSRR would be in best-focus. In various implementations, a determination of such a phase timing for each FSRR may be utilized in combination with known effective focus positions (Z-heights) of each FSRR, in order to determine corresponding calibration data relating phase timings to effective focus positions (Z-heights) for the system, as will be described in more detail below with respect to FIGS. 11-15.

As noted above, in various implementations, the images 700A, 700B and 700C may represent three example images from such an image stack (e.g., with the image 700B taken near the middle of the range and with the images 700A and 700C taken near opposite ends of the range). In various implementations, when such an image stack is to be acquired as part of a calibration process, certain calibration and/or other variables may initially be determined. For example, a VFL lens controller may provide an indication of current values of certain input or other variables, such as a resonant frequency Fres for the VFL lens, a VFL lens/controller temperature Tcntrlr, a level of electrical power Pelec, etc. In various instances, certain mobile manipulator control program (MOMAC) variables may be taken from such variables or otherwise determined, such as a phase delay Pd, the level of electrical power Pelec, the resonant frequency Fres for the VFL lens, a phase difference degree PhaseDiffDegree, etc. Once the current values for such variables are received or otherwise determined, a determination may be made of time increments (or other range divisions) in which images are to be obtained for an image stack of images of the calibration object.

In one specific example implementation, the full effective focus position range (Z range) (i.e., top to bottom=180 degrees) may be divided into ½-degree increments (i.e., resulting in 360 steps in this specific example implementation). Each step may be expressed in time (e.g., seconds) so that 2× the resonant frequency Fres yields the total time needed to scan 180 degrees. The time for each step thus represents the phase delay (i.e., of the VFL lens modulation) in seconds (e.g., nominally corresponding to an acquisition time for each image in the image stack). A duration of a light pulse (e.g., which in certain implementations may be constant for the acquisition of each image) may also be specified (e.g., 50 nsec, etc.), and may be triggered according to the timing for each image as indicated above. In various implementations, certain values (e.g., the time for each step, the duration of the light pulse, etc.) may be recorded in a corresponding look-up table (LUT) that is utilized for performing the next steps of the calibration process.

In various implementations, the values noted above may be utilized to obtain an image stack of images of the calibration object (e.g., including a specified number of images, such as approximately 360 images in accordance with the above specific example values). In addition to the image stack, an extended depth of field image (e.g., as will be described in more detail below with respect to FIG. 8) may also be obtained (e.g., utilizing known techniques for the operation of the VFL lens and in some instances utilizing some or all of the phase timings for the light pulses as indicated by the above example values and/or other phase timings, etc.). Furthermore, an off VFL image may be obtained (e.g., as will be described in more detail below with respect to FIG. 10), as acquired at a time when the VFL lens is in a state where the optical power of the VFL lens is not being modulated and the VFL lens provides no lensing effect (e.g., the lens may be powered off, etc.), for which the off VFL camera image corresponds to an effective focus position that is determined at least in part by the objective lens but is not determined by a modulation of the optical power or a lensing effect of the VFL lens. In various implementations, each of these images (i.e., the images of the image stack, the EDOF image and/or the off VFL image) may be utilized for various parts of a calibration process, as will be described in more detail below.

Figure 8:
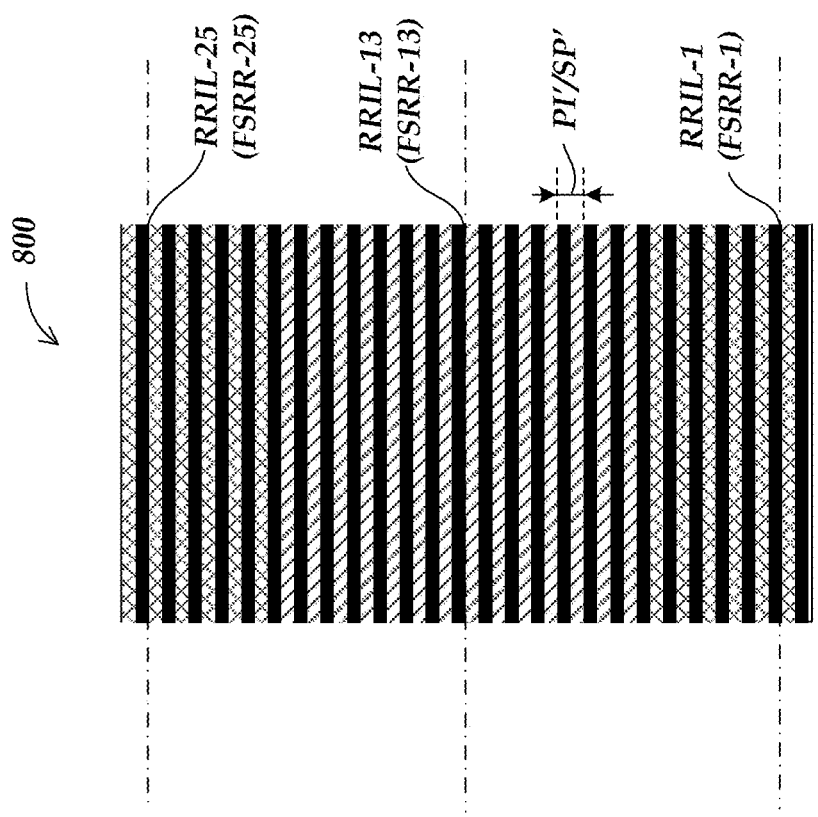
FIG. 8 is a diagram representing an extended depth of field image of the calibration object of FIG. 6.

FIG. 8 is a diagram representing an extended depth of field (EDOF) image 800 of the calibration object 620 of FIG. 6. In such an EDOF image, the depth of field is larger than that provided by the imaging system at a single focus position. Various methods are known for acquiring an image with an extended depth of field (e.g., utilizing a VFL lens), for example as described in U.S. Pat. No. 10,101,572, which is hereby incorporated herein by reference in its entirety. As will be described in more detail below, in various implementations, a method for calibrating a VFL lens system may include utilizing an EDOF image to determine approximate positions of each of the FSRRs (e.g., for which the approximate positions may be utilized for various purposes such as positioning regions of interest in images for determining focus characteristic values for the FSRRs in the images, etc.).

In various implementations, an EDOF image such as that of FIG. 8 may include images of the FSRRs with an acceptable amount of focus/contrast for certain purposes, but for which the focus/contrast may not be exact or consistent within certain tolerances for all FSRRs across the contrast pattern (e.g., as may result from the processing methods that are utilized for creating/obtaining the EDOF image). The potentially varying focus/contrast of the FSRRs is illustrated in FIG. 8 by the varying cross-hatch patterns between the pattern elements. Due to such factors with regard to an EDOF image, when more precise analysis is desired for certain operations (e.g., for determining precise locations of the FSRRs, etc.), images from an image stack may alternatively be utilized for such processing, as will be described in more detail below. In various implementations, in the EDOF image 800, the FSRRs are illustrated as having a synthetic pitch PI' and/or spacings SP' relative to one another, due to the tilt angle TA relative to the objective lens 350 (e.g., as compared to the pitch PI and spacings SP indicated in FIG. 6 with the planar surface pattern SRF viewed from a non-tilted orientation). It will be appreciated that the synthetic pitch PI' and spacings SP' may similarly correspond to those in the images of FIGS. 7A-7C. In various implementations, as part of various calibration processes, an EDOF image such as that of FIG. 8 may be utilized for various purposes, as will be described in more detail below with respect to FIGS. 9, 10 and 11.

FIG. 9 is a diagram illustrating a determination of a rotation angle RA of an image 900 that may be utilized to compensate for a rotation of a calibration object (e.g., relative to the VFL lens system, etc.). As will be described in more detail below, in various implementations, a method for calibrating a VFL lens system may include performing an alignment process, which comprises utilizing an alignment image (e.g., image 900) and at least one of the known region relationship of the FSRRs relative to one another (e.g., according to a spacing or pitch) or the known geometric relationship of the FSRRs to the planar tilted pattern surface (e.g., according to a known alignment) to at least one of determine or compensate for an alignment of the calibration object relative to the VFL lens system. In various implementations the alignment image may be at least one of a camera image of an image stack, an EDOF image (e.g., such as that of FIG. 8), or an off VFL camera image (e.g., such as that of FIG. 10).

In various implementations, the utilizing of the alignment image may include analyzing the alignment image to determine a synthetic frequency which may indicate the alignment of the calibration object relative to the VFL lens system. In various implementations, the synthetic frequency may be determined by processing a 2D Fourier transform of the alignment image. In various implementations, the alignment process may include determining an alignment of the calibration object which corresponds to a rotation angle of the calibration object relative to the VFL lens system (e.g., rotation angle RA of FIG. 9 as will be described in more detail below), and compensating for the alignment of the calibration object relative to the VFL lens system (e.g., by rotating at least one image of the calibration object by the rotation angle before further processing of the at least one image).

With respect to the example of FIG. 9, as noted above, in various implementations, the image 900 that is utilized for the determination of a rotation angle may be an EDOF image (e.g., such as that of FIG. 8) or alternatively may be another type of image of the calibration object (e.g., an image from an image stack, or an off VFL image, etc.). In the example illustrated in FIG. 9, the image 900 is a rotated version of the EDOF image of FIG. 8 (i.e., for which for simplicity of the illustration the cross-hatch patterns between the pattern elements in FIG. 8 have not been included in FIG. 9).

In various implementations, when a user or system positions a calibration object (e.g., on a stage within the field of view of the objective lens 350 and imaging system), the orientation of the calibration object may not be precisely aligned relative to a desired vertical or horizontal orientation (e.g., relative to the VFL lens system). More specifically, in various implementations, the calibration object may have a degree of rotation in one or more of pitch, yaw or roll relative to the VFL lens system (e.g., due to placement/ positioning/orientation by the user, uneven surface of a stage or surface on which the calibration object is placed, etc.). In the example of FIG. 9, the calibration object has been oriented such that the contrast pattern has a degree of rotation relative to a vertical orientation.

As illustrated in FIG. 9, the calibration object is in an image plane with corresponding local Xco, Yco and Zco calibration object coordinate axes (i.e., for which the Xco and Yco axes are noted to be rotated relative to the X and Y axes of the VFL lens system). As shown in FIG. 9, a calibration object rotation angle RA is determined that indicates an amount of rotation of the calibration object (e.g., as corresponding to an angle between the local Xco axis direction and the X axis direction). In various implementations, it may be desirable for the orientation of the calibration object to be determined from an EDOF image (e.g., for which a large number of pattern elements may be analyzed to determine an average orientation as indicating the orientation of the overall calibration object, as opposed to only analyzing one or a few pattern elements, which may result in a less accurate determination due to fewer sampling points, etc.).

In various implementations, a process for compensating for the rotation of the calibration object may include analyzing the EDOF image 900 to determine a synthetic frequency of the contrast pattern (e.g., including FSRRs/grating lines, etc.) along the X axis direction (e.g., as opposed to the frequency along the Xco axis direction). In one implementation, such analysis may include processing a 2D Fourier transform or fast Fourier transform (FFT) to determine the synthetic frequency of the EDOF image 900. In various implementations, the synthetic frequency of the EDOF image 900 (e.g., as compared to the known synthetic frequency with the contrast pattern aligned horizontally, such as illustrated in FIG. 8, and with the known synthetic frequency as corresponding to the pitch PI' and spacings SP') may be indicative of a rotation angle RA of the calibration object The measured synthetic frequency (fundamental of the Fourier transform) from the LinEDOF image is used to compensate the tilt angle TA (e.g., determine the relationship between the actual tilt angle TA and the known or designed tilt angle of the calibration object) for use in the related computations and calibration. The measured synthetic frequency of higher orders of the Fourier transform may be used to determine the rotation angle RA and compensate for its effects in related computations and calibration.

In various implementations, the calibration object rotation angle RA may be compensated for by rotating corresponding images by the rotation angle before further processing. More specifically, in various implementations, before any further image processing is performed (e.g., as will be described in more detail below), each image to be processed/analyzed may first be rotated (e.g., utilizing known image processing and/or software techniques for rotation) so as to remove any bias to the measurement of the pitch of the contrast pattern (e.g., the pitch of the FSRRs/grating). In various implementations, as an alternative or in addition to rotating the images, various known mathematical and/or other processing techniques may be utilized with respect to the corresponding image data (e.g., to achieve a similar affect as rotating the image or otherwise) for compensating for the rotation.

Figure 10:
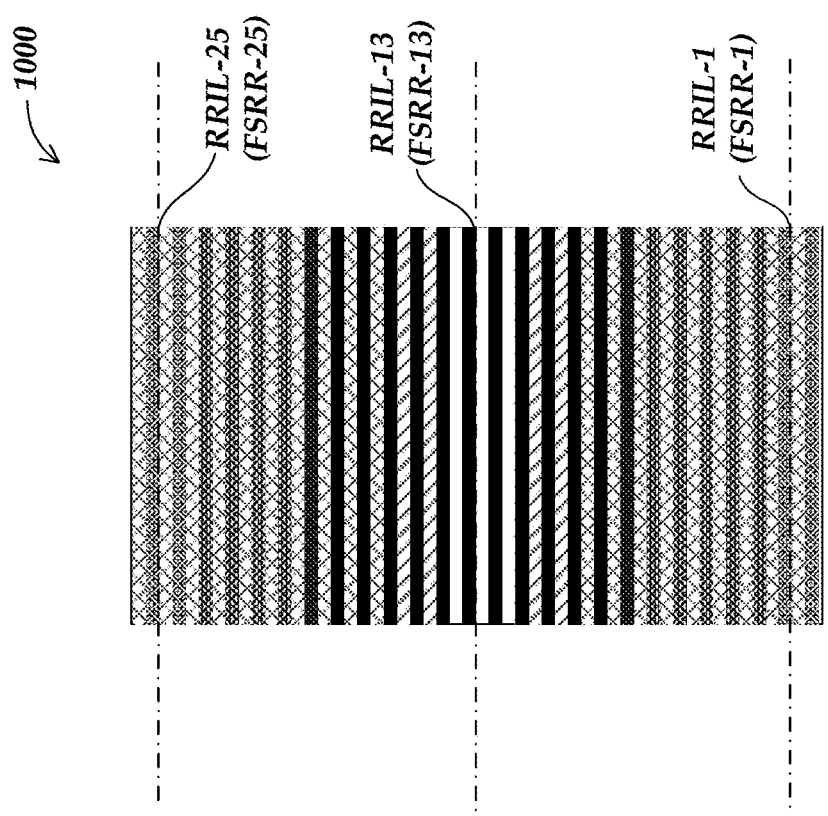
FIG. 10 is a diagram representing an off VFL camera image that includes an image of the calibration object of FIG. 6 that is taken in a state where the optical power of the VFL lens is not being modulated and the VFL lens provides no lensing effect.

FIG. 10 is a diagram representing an off VFL camera image 1000 that includes an image of the calibration object of FIG. 6, and is taken when the VFL lens is in a state where the optical power of the VFL lens is not being modulated and the VFL lens provides no lensing effect (e.g., the lens may be powered off, etc.). As will be described in more detail below, as part of a method for calibrating a VFL lens system, in various implementations, an off VFL camera image may be analyzed to determine a representative value which is referenced to corresponding values of images of an image stack and which corresponds to a working distance WD from the objective lens 350. In various implementations, an interpolated value between two corresponding values of the images of the image stack may be determined which matches the representative value of the off VFL camera image (e.g., and which is designated as corresponding to the working distance WD). In various implementations, the representative value may be a pixel position that is determined at least in part by performing a line scan on the off VFL camera image.

With respect to the example of FIG. 10, as noted above, the off VFL image 1000 may be utilized in relationship to a working distance WD of the objective lens. In various implementations, for determining a working distance WD of an objective lens, calibration of the objective lens may initially be performed (e.g., at a factory before shipment, etc.). In various implementations, as part of the initial calibration of the objective lens, points from focus (PFF) focal plane correction (FPC) (i.e., as related to field curvature) may be calibrated. At a subsequent time (e.g., when the objective lens is to be used), a points from focus or other mechanism (e.g., including an internal diameter gauge, etc.) may be utilized to precisely measure the working distance WD of the objective lens (e.g., corresponding to the distance of the objective lens nose plane to a reference plane or position, such as a focal plane correction (FPC) reference plane or position, etc.). In various implementations, other measuring tools/devices/objects (gauge blocks, etc.) may also or alternatively be utilized for precisely measuring the working distance WD of the objective lens. In various implementations, the working distance WD may also be referenced in terms of a machine-coordinate system (MCS), which may be useful for the calibration of the VFL system, as will be described in more detail below. More specifically, as noted above, for a factory PFF calibration of the objective lens, a first MCS reference to the objective lens mounting flange (e.g., a parfocal distance) may be established by physically or otherwise measuring the working distance WD.

In various implementations, the off VFL image 1000 may nominally correspond to an effective focus position that corresponds to the working distance WD and thus corresponds to an MCS reference position. It will be appreciated that such an effective focus position is determined at least in part by the objective lens, but is not determined by a modulation of the optical power or a lensing of the VFL lens. As will be described in more detail below, the corresponding external reference position may be useful as part of the calibration process, and may indicate a precise external reference distance from the objective lens 350 to a determined position on the calibration object 620, etc. (e.g., which otherwise may not be known or available), and may serve as an anchoring known reference position relative to the images of the image stack and/or corresponding data that is determined, etc.

For example, for prior calibration processes for lens systems (e.g., where for given positions of a stage or other distances between an objective lens and an object or surface being measured/utilized for calibration), there may typically have been a known/physically measurable distance that could be referenced for a measurement/calibration position (e.g., a distance as physically known/measurable between the objective lens and the object/surface being utilized for the calibration). In contrast, in various implementations, for calibration being performed for certain types of VFL lens systems (e.g., including a TAG lens that creates a lensing effect using waves in a fluid medium), there may be no corresponding physically known/measurable distance to a current/effective lens position (e.g., with respect to the modulating optical power of the VFL lens produced by waves in the fluid medium). For example, for a given set of images/data/measurements that are acquired during a calibration process for a VFL system, it may not be certain what position/value within a range of acquired images/data/measurements may precisely correspond to a specific external reference position/location (e.g., in one instance it may not be certain what position/value corresponds to a zero optical power position within the range).

As a specific example, for a stack of images acquired during such a calibration process of a VFL lens system, the image stack may not include an image that exactly corresponds to a desired external reference position (e.g., at a known MCS position), and a corresponding relative position within the image stack range may not be known. In accordance with principles disclosed herein, the off VFL image may be utilized to effectively provide an indication of a relative location/position of such an image within the image stack range. More specifically, in various implementations, by acquiring and analyzing the off VFL image which corresponds to an exact external reference position (e.g., at a known MCS position), and by analyzing the images of the image stack to determine where within the range of the image stack (e.g., where within the range of the values corresponding to the images of the image stack), the off VFL image falls (e.g., where a value corresponding to the off VFL image falls within the range of values), that precise relative position/value within the range can be established which provides an anchor/known reference position/location/value (e.g., to which the range and/or images/corresponding values of the image stack can be referenced). As described herein, in various implementations, the off VFL image may correspond to a zero-optical power position/value of the VFL lens during the periodic modulation, for which a precise reference distance may be known/physically measured (e.g., corresponding to a working distance WD of the objective lens 350). Thus, in various implementations, by determining a precise relative position/location/value within the range to which the off VFL image (e.g., or an associated value) corresponds, the range and/or associated values/data points may be anchored/referenced to the corresponding known external reference position/location/coordinates/distance (e.g., at a known MCS position/location/distance).

As noted above, in various implementations, the off VFL image 1000 may be utilized to determine one or more camera images of the image stack that are similar to the off VFL camera image, and thereby determine where in the range of the image stack the off VFL image 1000 corresponds to. More specifically, the image stack may include images at effective focus positions that are similar to the off VFL image 1000 (e.g., at effective focus positions that are slightly above and below the working distance WD), and the off VFL image 1000 may in some instances be regarded as a "twin" image to an image of the image stack that would be obtained at a corresponding phase timing and as having an effective focus position that is equal to the working distance WD. By determining such a position within the range of the image stack values, which corresponds to an MCS reference position, the remaining positions (e.g., of the images, etc.) in the image stack, and/or data determined therefrom, may also thereby be referenced to the MCS. In various implementations, such configurations may have various advantages with respect to calibrating a VFL lens system. For example, certain prior systems have not otherwise had such an MCS reference position and/or for which such an external reference position has not otherwise been obvious (e.g., for being utilized for externally verifying calibration stability, etc.).

In general, the off VFL image 1000 of the calibration object 620 may be nominally identical (e.g., nominally a twin) to an image of the calibration object 620 that would correspond to a phase timing when the modulating optical power of the VFL lens is at a zero value (e.g., as crossing a zero value during the modulation between positive and negative values of the optical power). As noted above, the effective focus position corresponding to the off VFL image 1000 may nominally correspond to the working distance WD, which may be known and/or determined (e.g., utilizing external physical calibration and/or measurement processes) with a high degree of accuracy, and which may serve as an anchoring reference position relative to the images of the image stack and/or corresponding determined data, etc.

In one specific example implementation, a process for determining a value that indicates a position within the image stack that corresponds to the off VFL image 1000 may include performing a scan across the image 1000 (e.g., across a center of the image 1000). For example, in one implementation a type of video tool (e.g., an edge detection tool, etc.) may be utilized to scan across the image (e.g., a scan line positioned across the center of the image across the pattern elements PE of the contrast pattern CP), in order to determine the focus characteristic values (e.g., quantitative contrast and/or focus metric values) across the image (i.e., corresponding to the focus characteristic values across the grating line edges or other elements of the contrast pattern, etc.). As noted above with respect to FIG. 9, prior to such processing, any needed compensation for the rotation of the off VFL image 1000 may be performed (e.g., by rotating the image according to the rotation angle as described above with respect to FIG. 9, etc.).

Once the focus characteristic values or other data is determined from the scan across the image, a position and/or value corresponding to the image is determined. In one specific example implementation, this may include analyzing the focus characteristic values or other data (e.g., performing envelope fitting relative to the minimum/maximum focus characteristic value peaks which enables measuring of the peak burst modulation to subpixel accuracy, etc.), in order to determine a corresponding position (e.g., which may correspond to a centroid or other representation of the focus characteristic values data as represented by a modulating focus characteristic value across the contrast pattern). As noted above, the position that is determined by such processes may nominally correspond to the objective lens working distance WD (e.g., with a fixed offset).

In various implementations, the position of the image 1000 may be expressed (e.g., in terms of index data, etc.) relative to the pixels of the detector (e.g., of the camera 360). As one specific example value, the index data value may correspond to 636.50 pixels (e.g., with the detector of the camera having a range across the relevant axis of approximately 1280 pixels). In various implementations, the determined position (e.g., the index data value of 636.50) corresponding to the image 1000 may be compared to other positions (e.g., in terms of pixel positions) as determined from analysis of images in the image stack. An interpolated position that matches the determined position of the image 1000 may be regarded as a "twin" of the image 1000 and may be considered to nominally correspond to the working distance WD. In this manner, the working distance WD may be anchored to a specific interpolated position within the range of the image stack (e.g., as corresponding to an absolute position relative to the objective lens and allowing determined positions to be accurately referenced to and/or expressed in terms of the MCS).

FIGS. 11-14 illustrate processes for determining calibration data in accordance with the above examples and in accordance with principles disclosed herein. For the examples of FIGS. 11-14, the referenced calibration object is designated as having 110 FSRRs (e.g., including a grating with 110 grating line edges that are designated as FSRRs), but which is otherwise similar to, and has a similar structure as, the calibration objects described above, and which will be understood by analogy thereto. As will be described in more detail below, the example processes for determining calibration data include determining phase timings corresponding to peak focus characteristic values (e.g., peak quantitative contrast and/or focus metric values, etc.) for the FSRRs (e.g., see FIG. 11), determining pixel locations and corresponding effective focus positions (Z-heights) for each of the FSRRs (e.g., see FIG. 12), combining the determined data (e.g., see FIG. 13) which is used to determine a fitted curve for which calibration data is determined for equal step sizes (e.g., see FIG. 14). As will be described in more detail below, such processes (i.e., which utilize a calibration object as disclosed herein) have various advantages for calibrating a VFL system.

Figure 11:
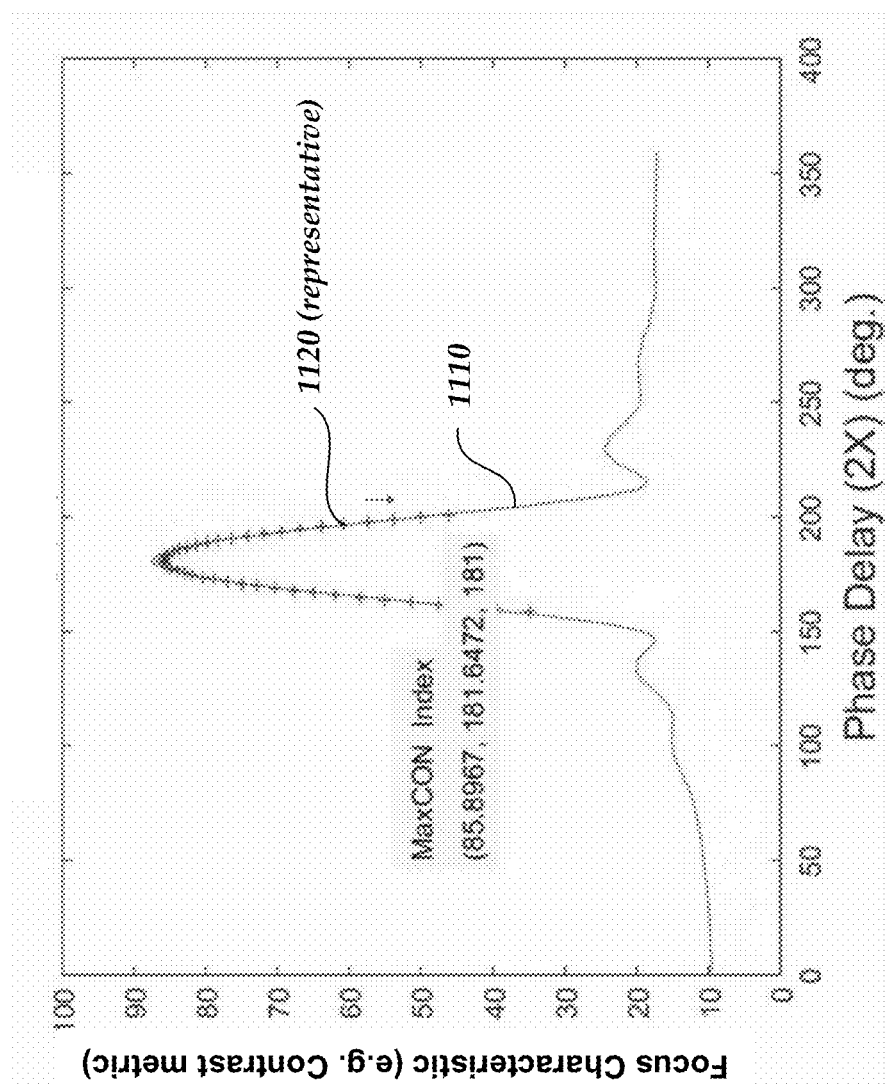
FIG. 11 is a diagram illustrating a focus characteristic value curve of an FSRR as determined from images of an image stack.

FIG. 11 is a diagram of a graph 1100 illustrating a focus characteristic value curve 1110 for an FSRR as determined from images of an image stack. As will be described in more detail below, in various implementations, a method for calibrating a VFL lens system may include analyzing camera images in an image stack to determine focus characteristic values for each FSRR in the camera images, in order to determine a phase timing of a peak focus characteristic value for each FSRR. In various implementations, the determined focus characteristic value for each FSRR may include a quantitative contrast metric value for the FSRR.

In the example of FIG. 11, the focus characteristic value curve 1110 may be utilized to determine a maximum contrast fitted centroid index value or other corresponding value for the FSRR. A similar process may be performed to determine a focus characteristic value curve for each of the FSRRs, for which the resulting values may be utilized for further determinations (e.g., determining pixel positions vs. effective focus positions (Z-heights) for the FSRRs, as may be referenced to a position in the range corresponding to a working distance WD/off VFL image (e.g., image 1000), as will be described in more detail below with respect to FIG. 12).

For the determination of the focus characteristic value curve 1110 for the FSRR as illustrated in FIG. 11, an initial step may include determining an approximate position of the FSRR in the images of the image stack. Once an approximate position is determined, it may be utilized for positioning a region of interest at a same location in each image (e.g., so as to determine a focus characteristic value for the FSRR in each image, which may correspondingly indicate the images in which the FSRR has a higher level of focus, and for which a timing/phase delay value may be determined of when the FSRR is in the best focus, etc.). In various implementations, the determinations of the approximate positions of the FSRRs may include analyzing an EDOF image of the calibration object (e.g., similar to the EDOF image 800 of FIG. 8), or other type of image.

In an implementation where an EDOF image or other image is analyzed, the process may include performing a focus characteristic value scan or other scan to determine the approximate pixel positions of the FSRRs across the detector of the camera 360 (e.g., as indicated in the image). In one specific example implementation, a focus characteristic value scan or other processing of the image may be utilized to determine rough/approximate "seed" positions corresponding to the FSRRs. In various implementations, the determined approximate positions may be stored in one or more look-up tables LUT, and may be utilized as indicated above and for other processing, as will be described in more detail below. In various implementations, as part of the determination of the approximate positions, a check may be performed to confirm that no FSRRs were missed in the determinations of the approximate positions. For example, due to the known number of FSRRs, a look-up table LUT with a corresponding number of entries and/or other techniques may be utilized to verify that the determined number of approximate positions matches the known number of FSRRs.

As noted above, an approximate position of an FSRR (e.g., as determined by the above example process) may be utilized for positioning a region of interest within each of the images of the image stack for determining a level of a focus characteristic value (e.g., a quantitative contrast and/or focus metric value) as associated with that FSRR in each of the images. In various implementations, such processes may be performed in accordance with known points-from-focus (PFF) or other analysis operations, which may indicate a phase timing of a peak focus characteristic value for each FSRR (e.g., which indicates a best focus timing for the FSRR). Exemplary techniques for the determination and analysis of image stacks and focus curves, and for points-from-focus and edge analysis operations, etc., are taught in U.S. Pat. Nos. 6,542,180; 7,003,161; 7,627,162; 9,060,117; and 9,602,715, each of which is hereby incorporated herein by reference in its entirety.

In one specific example implementation, in accordance with such operations, a region of interest that is sized to detect an FSRR may be positioned (e.g., centered) relative to the approximate position of the FSRR in each of the images. The region of interest may be associated with a video tool or other analysis mechanism that may be utilized for determining a focus characteristic value (e.g., a quantitative contrast and/or focus metric value) within the region of interest. In various implementations, higher focus characteristic values may generally correspond to images in which the FSRR is more in focus. In the example of FIG. 11, each data point 1120 represents a peak focus characteristic value for the FSRR in a respective image of the image stack. The curve 1110 results from 360 measured contrast values calculated within one FSRR (out of ~110 FSRR or so). The cross points are a 42-pt. 2nd order fit to the contrast peak in 1110. In various implementations, the curve 1110 may result from a fitting to the data points 1120 that are determined from the images of the image stack.

By analyzing the focus characteristic values from the images of the image stack (e.g., as represented by the curve 1110), a "peak" focus characteristic value may be determined (e.g., the peak of the curve 1110) that indicates when the FSRR is most in focus during the range of the period modulation, as may correspond to a phase timing of a particular image or an interpolated phase timing between images. In various implementations, the peak may be determined according to a fitted centroid of the values, and may be represented as a maximum contrast fitted centroid index value. In accordance with the operation of the VFL lens, each of the images is associated with a timing/phase delay of when the image was acquired (e.g., as indicated by the timings/phase delays of each of the data points 1120), and a maximum contrast fitted centroid index value may also correspondingly be associated with a timing/phase delay of when the FSRR is in best focus. In the specific example of FIG. 11, the peak value for the FSRR is indicated as being at a timing/phase delay along the X axis with a maximum contrast fitted centroid index value of approximately 181.6472 degrees. In various implementations, such a value (e.g., which is near a 180-degree midpoint of the 360-degree range for the phase delays x2 on the X axis), may in some instances indicate that the FSRR is near the middle of the range of FSRRs on the calibration object (e.g., for a calibration object with 110 FSRRs, the FSRR may be, or may be near, the 55th FSRR). Such an FSRR near the middle of the range may also be near the nominal effective focus position EFPnom and/or the determined location of the working distance WD (e.g., similar to the FSRR-13 in the example of FIGS. 6-10). As will be described in more detail below with respect to FIGS. 12 and 13, such data representing the phase timing of a peak focus characteristic value for each FSRR may be combined with data representing the effective focus position (Z-height) of each FSRR, in order to determine calibration data for the system which correlates time/phase delays to effective focus positions (Z-heights).

Figure 12:
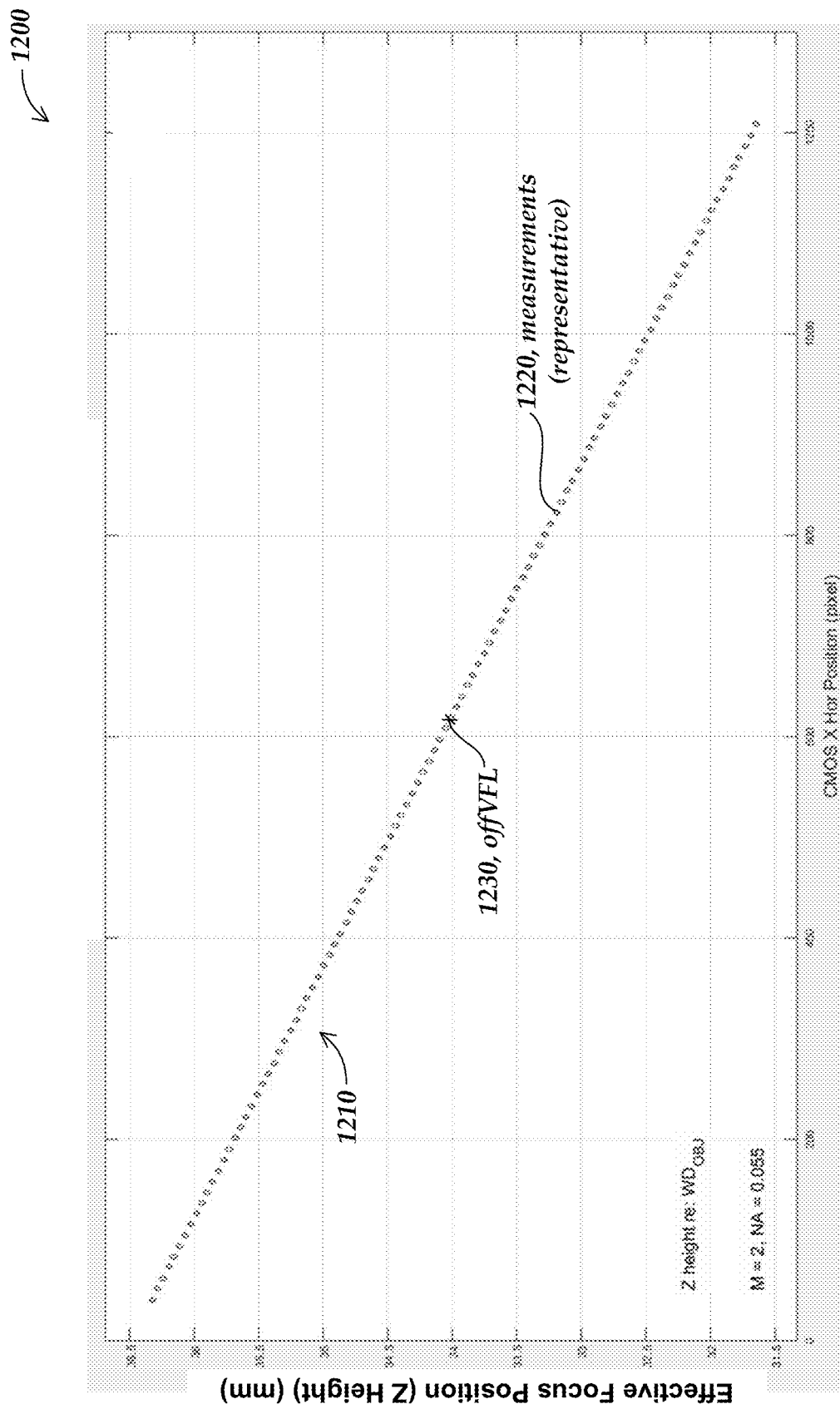
FIG. 12 is a diagram illustrating image pixel locations of FSRRs as determined with subpixel accuracy and corresponding effective focus positions (Z-heights) of the FSRRs.

FIG. 12 is a diagram of a graph 1200 illustrating image pixel locations of FSRRs as determined with subpixel accuracy, and corresponding effective focus positions (Z-heights) of the FSRRs. As will be described in more detail below, in various implementations, a method for calibrating a VFL lens system may include determining an effective focus position (Z-height) of each FSRR. In various implementations, the determining of the effective focus position of each of the FSRRs may include determining a pixel location with subpixel accuracy of each of the FSRRs in one or more of the camera images. The effective focus position of the FSRR may then be determined based on the determined pixel location and known physical characteristics of the calibration object and the VFL lens system, including at least the tilt angle of the planar tilted pattern surface, the magnification of the objective lens, and the pixel size.

In the example of FIG. 12, the data 1210 is illustrated as being nominally linear in nature, and includes individual data points 1220 which each represent an FSRR with a corresponding pixel position, as indicated along the X axis, and a corresponding effective focus position (Z-height), as indicated along the Y axis. The data 1210 approximately fits a nominally linear decreasing function (e.g., as corresponding to the tilt angle of the planar tilted pattern surface of the calibration object on which the FSRRs are located). As noted above, the calibration object utilized for the examples of FIGS. 11-14 includes 110 FSRRs, for which there are 110 corresponding data points 1220 illustrated in FIG. 12. A relative position determined with respect to an off VFL image of the calibration object (e.g., similar to the image 1000 as described above), and as nominally corresponding to a working distance WD, is represented by a data point 1230.

In various implementations, the determining of the data points 1220 includes determining from the stack of images the pixel locations (e.g., with subpixel accuracy) of the FSRRs. For example, based on the analysis for determining the phase timing of the best focus for an FSRR (or other analysis), an image may be determined/selected from the image stack that is closest to or otherwise near the best focus position. Once the image is selected, the image may be analyzed to determine the pixel location (e.g., with subpixel accuracy) of the FSRR in the image. With regard to such analysis, an approximate position (e.g., as determined from the EDOF image or otherwise as described above) may be utilized for positioning a region of interest (e.g., for an edge detection tool, etc.), which may be utilized to determine the precise pixel location (e.g., to subpixel accuracy) of the FSRR. Based on the determination of the precise pixel location of each FSRR, an exact effective focus position (Z-height) of each FSRR may also be determined. More specifically, in accordance with the known characteristics of the calibration object, the effective focus position (Z-height) of each FSRR may be determined in accordance with the known synthetic frequency of the FSRRs (e.g., as related to the compensated grating tilt), magnification (e.g., corresponding to the magnification of the current objective lens), pixel size, and the subpixel location of the feature (e.g., as determined in accordance with the process as described above).

Figure 13:
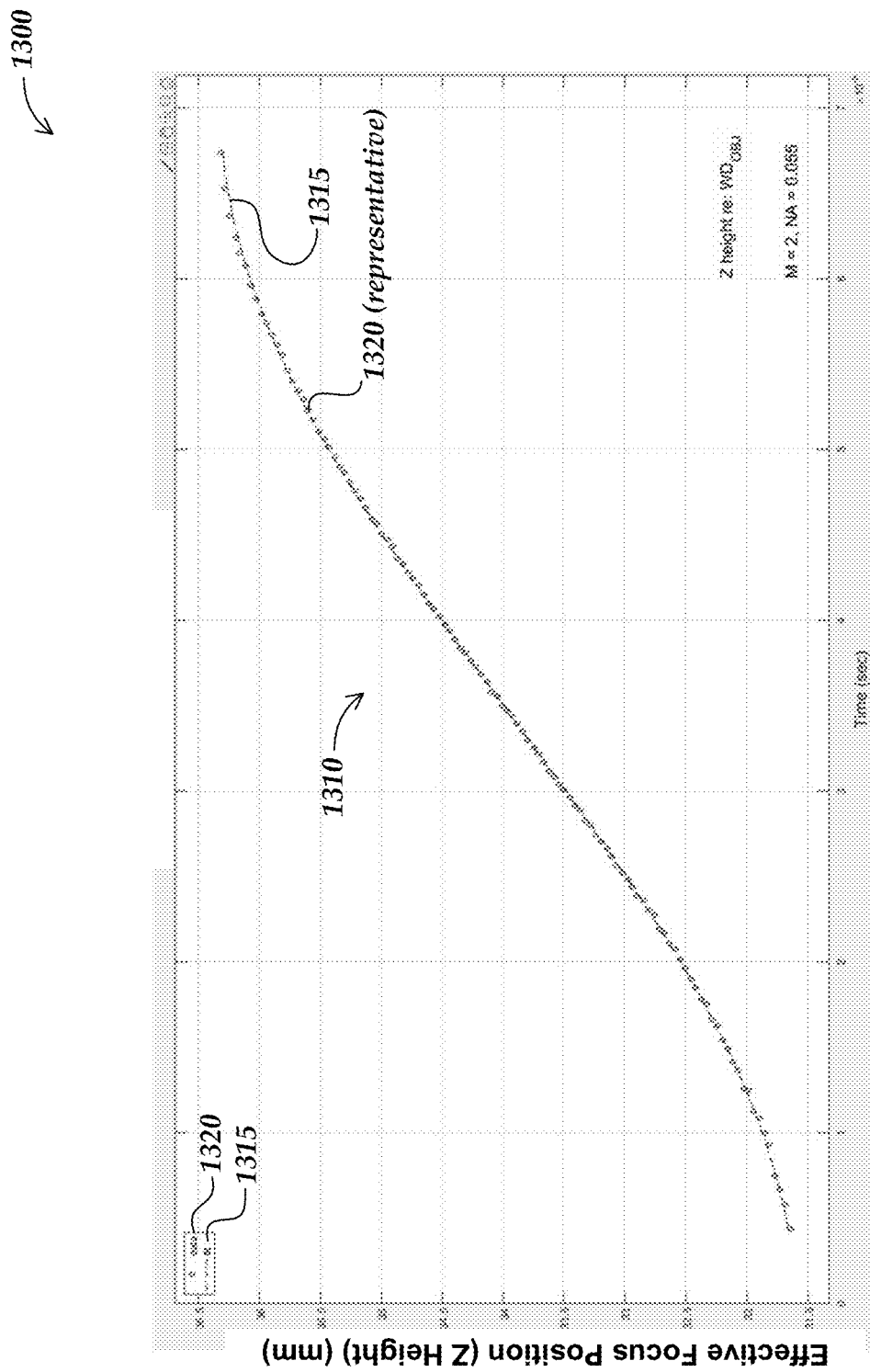
FIG. 13 is a diagram illustrating measured calibration data determined by combining data such as that of FIGS. 11 and 12.

FIG. 13 is a diagram of a graph 1300 illustrating measured calibration data determined by combining data such as that of FIGS. 11 and 12. In FIG. 13, the data 1310 includes individual data points 1320 which each represent an FSRR with a corresponding timing/phase delay of a best focus position, as indicated along the X axis, and a corresponding effective focus position (Z-height), as indicated along the Y axis. It will be appreciated that the timing/phase delay for each FSRR comes from data such as that of FIG. 11, and the corresponding effective focus position (Z-height) comes from data such as that of FIG. 12. In various implementations, it may be desirable to determine a fitted equation that represents the data 1310. For example, in one specific example implementation, a least-squares fit process may be performed relative to the data points 1320 to determine a sinusoid fitted equation that represents phase delay versus effective focus position (Z-height) values (e.g., for which a resulting nominally sinusoidal line 1315 is shown as corresponding to the sinusoid fitted equation). As will be described in more detail below with respect to FIG. 14, in various implementations, the sinusoid fitted equation may be utilized to determine phase timings corresponding to equally spaced effective focus positions within the range of modulation of the VFL lens.

Figure 14:
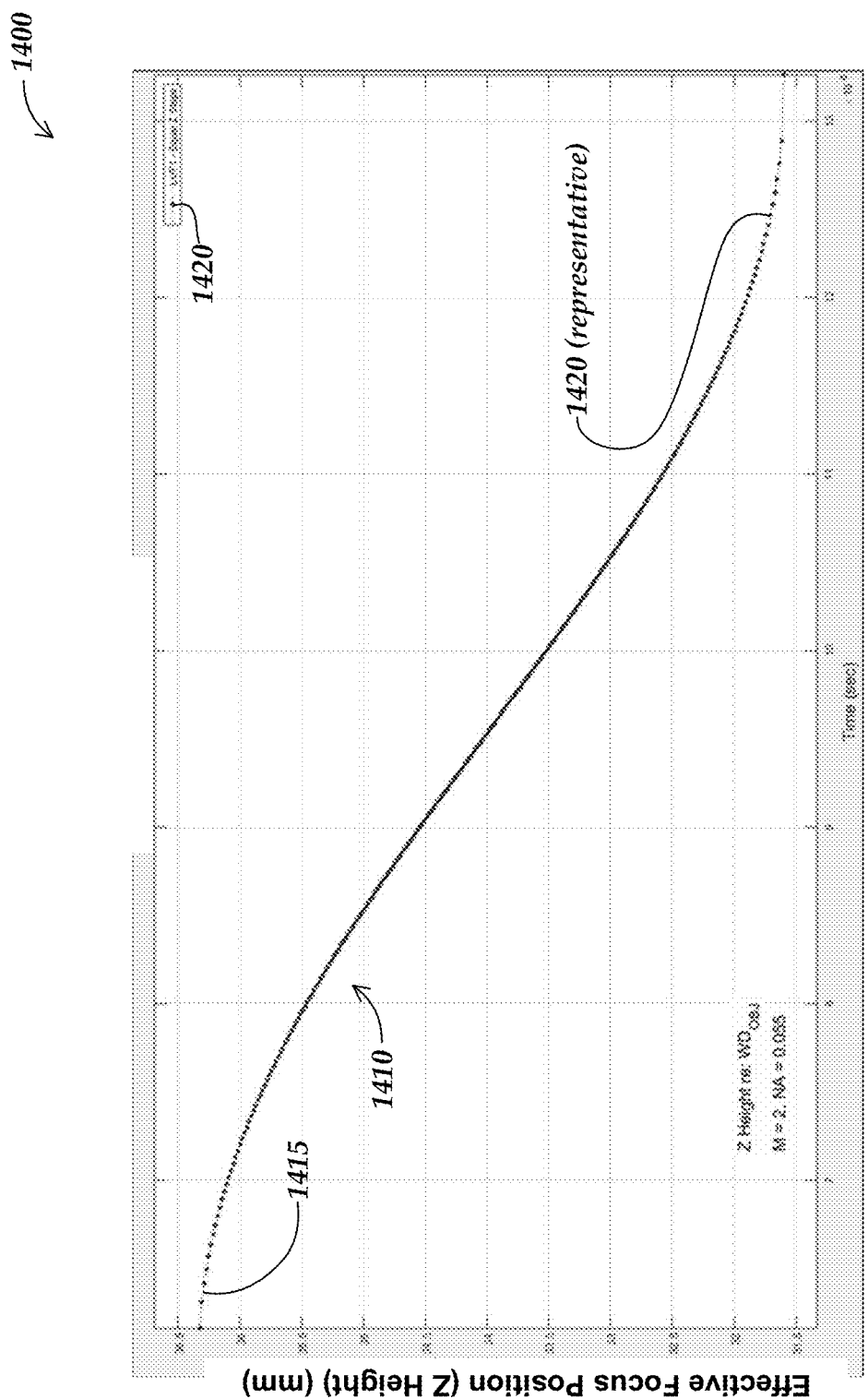
FIG. 14 is a diagram illustrating fitted calibration data with equal effective focus position (Z-height) steps determined from data such as that of FIG. 13.

FIG. 14 is a diagram of a graph 1400 illustrating fitted calibration data with equal effective focus position (Z-height) steps determined from data such as that of FIG. 13. In FIG. 14, a set of data 1410 including data points 1420 are illustrated. A line 1415 is similar to the line 1315 of FIG. 13, and corresponds to the sinusoid fitted equation determined from the data of FIG. 13, as described above. In relation to the sinusoid fitted equation, the data points 1420 are determined in accordance with equal step sizes (e.g., in terms of a proportion of a depth of field (DOF), such as $\frac{1}{10}$ of a DOF). Such characteristics may in some implementations be selected to match/achieve certain "per pixel Z repeatability" statistics, or otherwise. As a specific example value, for a 2× objective lens (i.e., with 2× magnification), with a DOF=186 um, a desired step size may be determined to be 18.6 um (i.e., equal to $\frac{1}{10}$ DOF).

Once the step size is determined, the full effective focus position (Z-height) scan range for the VFL lens (e.g., range Refp in FIG. 3) may be divided by the step size to determine the number of steps with equal effective focus position (Z-height) pitch (i.e., corresponding to spacings of the data points 1420 along the Y axis in FIG. 14). In various implementations, the data points 1420 along the curve may result from iterating the sine-fitted equation as noted above to determine the X axis values for each step along the Y axis that has the same effective focus position (Z-height) pitch. In various implementations, a tolerance for each iterated time may be specified/determined (e.g., a tolerance of 2 nanoseconds is utilized in the example of FIG. 14). In various implementations, the determined phase timings corresponding to the equally spaced effective focus positions (Z-heights) may be stored (e.g., in a look-up table (LUT) or otherwise) as at least part of the calibration data that indicates respective phase timings of the periodic modulation that correspond to respective effective focus positions (Z-heights) for the VFL lens system. In accordance with the specific example values described above, in one implementation a look-up table LUT may be produced with a list of 258 time/phase delay values, starting from a Z top value.

In various implementations, the calibration data that is determined from measuring the calibration object (i.e., with the known characteristics regarding the relative heights of the features, etc.) may in some instances be determined under certain specified calibration conditions. In various implementations, such specified conditions may include a specified steady-state temperature (e.g., T=20 degrees C.+/−0.25 degrees C.), with a specified objective lens 350 (e.g., one of the 1× to 50× magnification objective lenses) and for which the VFL lens 370 may be operated at a specified frequency (e.g., 70 kHz), for which a +/−1 diopter may result in a specified Z scan range (e.g., as specific example values a 5× objective lens may result in a Z scan range of approximately 0.4 mm to −0.4 mm). In such a configuration, a calibration object may be provided with a tilt that results in the contrast pattern having a range from at least −0.4 mm to +0.4 mm.

In various implementations, a VFL resonant frequency may be known to vary relatively directly with temperature variations and/or other conditions. In various implementations, when the calibration processes as described herein are performed with other than certain of the specified conditions (e.g., at other than a specified steady state temperature, such as T=20 degrees C., and/or at other than a specified resonant frequency of the VFL lens, such as 70 kHz, etc.), a compensation process may be performed. For example, in one implementation a compensation process may include determining/measuring the VFL resonant frequency (e.g., as may vary directly with temperature or other factors) and compensating for deviations from the specified resonant frequency (e.g., applying a compensation to the calibration data of +0.2 um/Hz).

Figure 15:
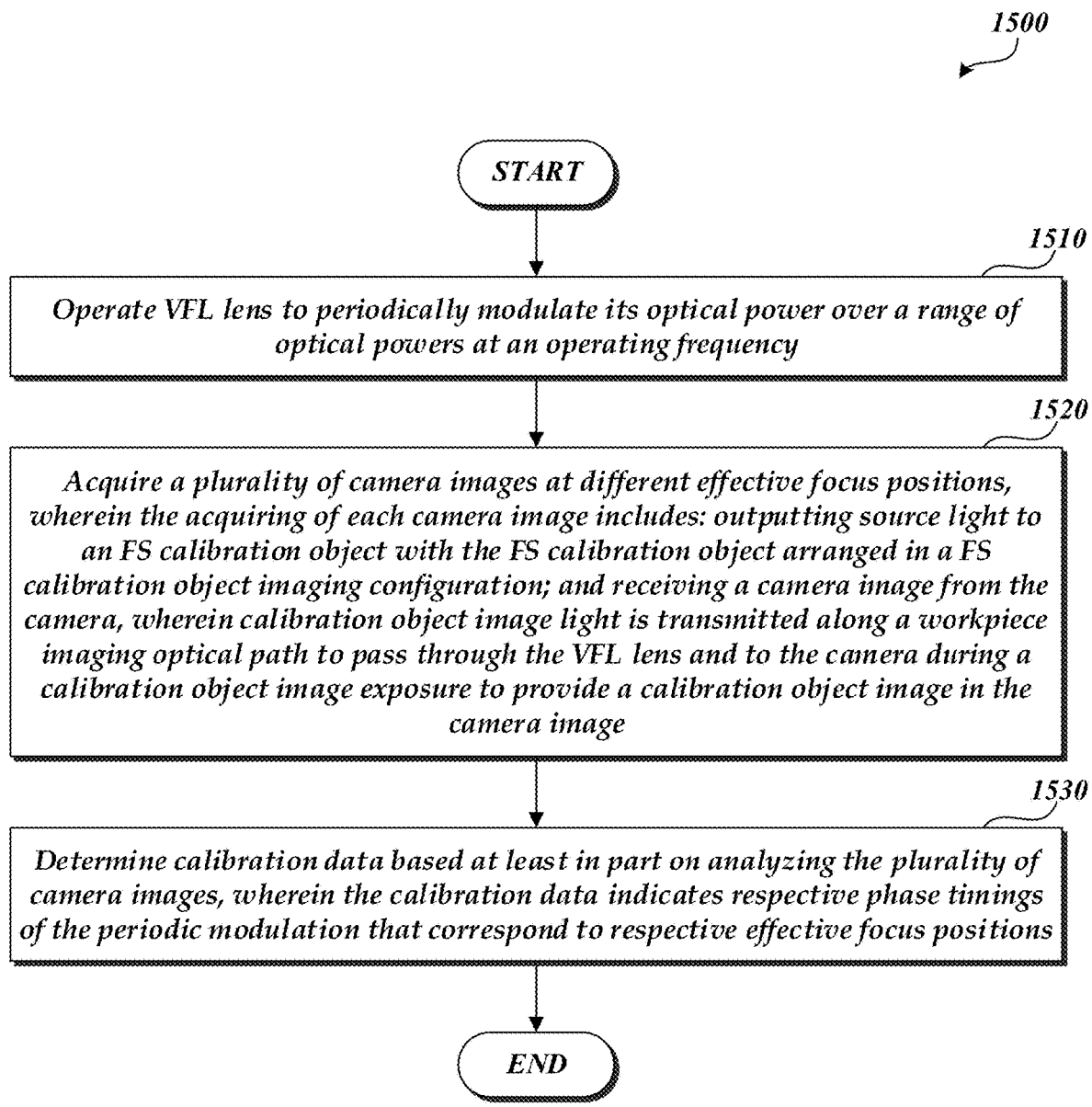
FIG. 15 is a flow diagram illustrating one exemplary implementation of a method for utilizing a calibration object for determining calibration data for a VFL lens system.

FIG. 15 is a flow diagram illustrating one exemplary implementation of routine 1500 for utilizing a calibration object for determining calibration data for a VFL lens system. At an operation block 1510, a VFL lens that is part of a VFL system is operated to periodically modulate the VFL lens optical power over a range of optical powers at an operating frequency. For example, in an implementation where the VFL lens is a TAG lens with a controllable acoustic wave generating element, the controllable acoustic wave generating element may be controlled with a drive signal (e.g., a nominally sinusoidal drive signal) to provide the periodically modulated optical power variation for the TAG lens (e.g., which may be nominally sinusoidal).

At an operation block 1520, a plurality of camera images (e.g., as part of an image stack which may include a number of images in the 10s or 100s, etc.) are acquired at different effective focus positions. In various implementations, the acquiring of each camera image includes outputting source light to a calibration object with the calibration object arranged in a calibration object imaging configuration and receiving a camera image from the camera. In various implementations, calibration object image light is transmitted along the workpiece imaging optical path to pass through the VFL lens and to the camera during a calibration object image exposure to provide a calibration object image in the camera image. As noted above, in various implementations, the calibration object includes the set of FSRRs that have respective known relative reference region image locations in the calibration object images, and that are fixed at different respective effective focus positions relative to the objective lens when the calibration object is arranged in the calibration object imaging configuration.

At an operation block 1530, calibration data is determined based at least in part on analyzing the plurality of camera images, wherein the calibration data indicates respective phase timings of the periodic modulation that correspond to respective effective focus positions (Z-heights). As noted above, in various implementations, the analyzing of the plurality of camera images (e.g., including calibration object images) may include determining focus characteristic values (e.g., quantitative contrast and/or focus metric values, etc.) for members of a set of FSRRs of the calibration object in the plurality of calibration object images exposed, using corresponding particular known phase timings. In various implementations, such processing/determinations may be performed at least in part by the reference region focus analyzer 384, the workpiece focus signal processing portion 375, and/or a remote computer, etc. Based on the determined focus characteristic values at the known phase timings, phase timings for when the FSRRs are in best focus may be determined (e.g., utilizing points from focus or other operations). Pixel locations of the FSRRs may be determined (e.g., utilizing video tools, etc., in the images of the image stack where the FSRRs are focused), and effective focus positions (Z-heights) of the FSRRs at the determined pixel locations may be determined utilizing the known characteristics of the calibration object (e.g., regarding the known and/or determinable effective focus positions (Z-heights) of the FSRRs at the RRILs).

The determined data from such processes may be combined to provide calibration data for the system that accurately relates phase timings to effective focus positions (Z-heights), and the determined calibration data may be stored (e.g., in a look-up table or otherwise). During subsequent measurement operations, one or more images of a workpiece may be acquired at particular known phase timings (e.g., in accordance with a phase timing of a strobe light source, etc.) for which a phase timing of when a workpiece feature is in best focus may be determined, for which the calibration data (e.g., as provided in a look-up table or otherwise) may be utilized to determine the accurate corresponding effective focus position (Z-height) of the workpiece feature.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. For example, a tilted calibration object may be implemented using an adjustable tilting mechanism, so that the calibration object focus position range Rco covered by the tilted calibration object may be adjusted to correspond to a particular objective lens, or to increase the focus distance selectivity or resolution associated with various focus state reference region locations, or the like. As another example, a calibration object may comprise at least one pattern surface which is at least partially curved, at least part of which is not perpendicular to an optical axis of the objective lens when arranged in a calibration object imaging configuration. Different portions of the at least one curved pattern surface may be fixed at different respective focus distances relative to the objective lens, and the set of FSRRs may be arranged on the at least one curved pattern surface.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for utilizing a focus state calibration object for determining calibration data for a variable focal length (VFL) lens system,
the VFL lens system comprising:
a VFL lens;
a VFL lens controller that controls a drive signal of the VFL lens to periodically modulate optical power of the VFL lens over a range of optical powers that occur at respective phase timings within the periodic modulation;
a camera that receives light transmitted along an imaging optical path through the VFL lens during an image exposure and provides a corresponding camera image;
an objective lens that inputs image light arising from at least one of a workpiece or a calibration object during an image exposure and transmits the image light along the imaging optical path through the VFL lens and to the camera during the image exposure, to provide at least one of a workpiece image or a calibration object image in a corresponding camera image, wherein an effective focus position in front of the objective lens during an image exposure corresponds to the optical power of the VFL lens during that image exposure; and
an exposure time controller configured to control an image exposure timing used for a camera image,
the calibration object comprising a planar tilted pattern surface on which a set of focus state reference regions (FSRRs) are distributed, wherein the FSRRs have known geometric relationships relative to the planar tilted pattern surface and have known region relationships relative to one another, and when the calibration object is arranged in a calibration object imaging configuration relative to the VFL lens system, the FSRRs are fixed at different respective effective focus positions relative to the objective lens and have respective reference region image locations (RRILs) in calibration object images;

the method comprising:
acquiring a plurality of camera images at different phase timings of the periodic modulation, wherein the acquiring of each camera image comprises:
outputting source light to the calibration object with the calibration object arranged in the calibration object imaging configuration; and
receiving a camera image from the camera, wherein calibration object image light is transmitted along the imaging optical path to pass through the VFL lens and to the camera during a calibration object image exposure to provide a calibration object image in the camera image; and
determining calibration data based at least in part on analyzing the plurality of camera images, wherein the calibration data indicates respective phase timings of the periodic modulation that correspond to respective effective focus positions.

2. The method of claim 1, wherein the determining of the calibration data comprises performing an alignment process which comprises utilizing an alignment image and at least one of the known region relationship or the known geometric relationship to at least one of determine or compensate for an alignment of the calibration object relative to the VFL lens system, wherein the alignment image comprises at least one of:
a camera image of the plurality of camera images;
an extended depth of field (EDOF) image of the calibration object; or
an off VFL camera image of the calibration object that is acquired when the VFL lens is in a state where the optical power of the VFL lens is not being modulated and the VFL lens provides no lensing effect.

3. The method of claim 2, wherein the utilizing of the alignment image comprises analyzing the alignment image to determine a synthetic frequency which indicates the alignment of the calibration object relative to the VFL lens system.

4. The method of claim 3, wherein the synthetic frequency is determined by processing a 2D Fourier transform of the alignment image.

5. The method of claim 2, wherein the alignment process includes:
determining an alignment of the calibration object which corresponds to a rotation angle of the calibration object relative to the VFL lens system; and
compensating for the alignment of the calibration object relative to the VFL lens system by rotating at least one image of the calibration object by the rotation angle before further processing of the at least one image.

6. The method of claim 1, wherein the determining of the calibration data comprises analyzing an off VFL camera image of the calibration object to determine a representative value which is referenced to corresponding values of the plurality of camera images and which corresponds to a working distance from the objective lens, wherein the off VFL camera image is acquired when the VFL lens is in a state where the optical power of the VFL lens is not being modulated and the VFL lens provides no lensing effect.

7. The method of claim 6, wherein an interpolated value between two corresponding values of the plurality of camera images is determined which matches the representative value of the off VFL camera image and which is designated as corresponding to the working distance.

8. The method of claim 6, wherein the representative value is a pixel position value that is determined at least in part by performing a line scan on the off VFL camera image.

9. The method of claim 1, wherein the analyzing of the plurality of camera images comprises determining focus characteristic values for each FSRR in the camera images in order to determine a phase timing of a peak focus characteristic value for each FSRR.

10. The method of claim 9, wherein the determined focus characteristic value for each FSRR comprises a quantitative contrast metric value for the FSRR.

11. The method of claim 9, wherein the analyzing of the plurality of camera images further comprises determining an effective focus position of each FSRR.

12. The method of claim 11, wherein the determining of the effective focus position of each of the FSRRs comprises determining a pixel location with subpixel accuracy of each of the FSRRs in one or more of the camera images and determining the effective focus position of the FSRR based on the determined pixel location and known physical characteristics of the calibration object and the VFL lens system, including at least a tilt angle of the planar tilted pattern surface, a magnification of the objective lens, and a pixel size.

13. The method of claim 11, wherein the determining of the calibration data further comprises combining data including the determined phase timings corresponding to the peak focus characteristic values of each FSRR and the determined effective focus position of each FSRR, wherein the combined data indicates phase timings as corresponding to effective focus positions for the VFL lens system.

14. The method of claim 13, wherein the determining of the calibration data further comprises determining a sinusoid fitted equation as fitted to the combined data, and utilizing the sinusoid fitted equation to determine phase timings corresponding to equally spaced effective focus positions within the range of modulation of the VFL lens, and storing the determined phase timings corresponding to the equally spaced effective focus positions as at least part of the calibration data that indicates respective phase timings of the periodic modulation that correspond to respective effective focus positions for the VFL lens system.

15. The method of claim 1, wherein the determining of the calibration data further comprises utilizing an extended depth of field (EDOF) image of the calibration object to determine approximate positions of each of the FSRRs, for which the approximate positions are utilized for positioning regions of interest in images for determining focus characteristic values for the FSRRs in the images.

16. The method of claim 1, wherein the VFL lens is a tunable acoustic gradient (TAG) lens.

17. A system, comprising:
a variable focal length (VFL) lens system, comprising:
a VFL lens;
a VFL lens controller that controls a drive signal of the VFL lens to periodically modulate optical power of the VFL lens over a range of optical powers that occur at respective phase timings within the periodic modulation;
a camera that receives light transmitted along an imaging optical path through the VFL lens during an image exposure and provides a corresponding camera image;
an objective lens that inputs image light arising from at least one of a workpiece or calibration object during an image exposure and transmits the image light along the imaging optical path through the VFL lens and to the camera during the image exposure, to provide at least one of a workpiece image or a calibration object image in a corresponding camera image, wherein an effective focus position in front of the objective lens during an image exposure corresponds to the optical power of the VFL lens during that image exposure; and
an exposure time controller configured to control an image exposure timing used for a camera image;
a calibration object comprising a planar tilted pattern surface on which a set of focus state reference regions (FSRRs) are distributed, wherein the FSRRs have known geometric relationships relative to the planar tilted pattern surface and have known region relationships relative to one another, and when the calibration object is arranged in a calibration object imaging configuration relative to the VFL lens system, the FSRRs are fixed at different respective effective focus positions relative to the objective lens and have respective reference region image locations (RRILs) in calibration object images; and
a computing system, comprising:
one or more processors; and
a memory coupled to the one or more processors and storing program instructions that when executed by the one or more processors cause the one or more processors to at least:
acquire a plurality of camera images of the calibration object at different phase timings of the periodic modulation with the calibration object arranged in the calibration object imaging configuration relative to the VFL lens system; and
determine calibration data based at least in part on analyzing the plurality of camera images, wherein the calibration data indicates respective phase timings of the periodic modulation that correspond to respective effective focus positions.

18. The system of claim 17, wherein the VFL lens is a tunable acoustic gradient (TAG) lens.

19. The system of claim 17, wherein the calibration object further comprises a reflective surface that is located below the planar tilted pattern surface and that is nominally orthogonal to an optical axis of a workpiece imaging optical path when the calibration object is arranged in the calibration object imaging configuration relative to the VFL lens system and for which source light that passes through the planar tilted pattern surface and is reflected by the reflective surface to pass back through the planar tilted pattern surface as calibration object image light is transmitted along the workpiece imaging optical path.

20. The system of claim 17, wherein the planar tilted pattern surface comprises a grating with grating lines, and each of the FSRRs of the plurality of FSRRs corresponds to an edge of one of the grating lines.

21. The system of claim 17, further comprising a plurality of additional calibration objects which are part of a set of calibration objects of which the calibration object is also a member, wherein each calibration object of the set of calibration objects has a planar tilted pattern surface with a different amount of tilt, and each calibration object of the set of calibration objects corresponds to a different objective lens with a different magnification, wherein when a calibration is performed of the VFL lens system, a calibration object is utilized from the set that corresponds to the objective lens that is utilized during the calibration.

22. A system for utilizing a focus state calibration object for determining calibration data for a variable focal length (VFL) lens system, the VFL lens system comprising:
a VFL lens;
a VFL lens controller that controls a drive signal of the VFL lens to periodically modulate optical power of the VFL lens over a range of optical powers that occur at respective phase timings within the periodic modulation;
a camera that receives light transmitted along an imaging optical path through the VFL lens during an image exposure and provides a corresponding camera image;
an objective lens that inputs image light arising from at least one of a workpiece or calibration object during an image exposure and transmits the image light along the imaging optical path through the VFL lens and to the camera during the image exposure, to provide at least one of a workpiece image or a calibration object image in a corresponding camera image, wherein an effective focus position in front of the objective lens during an image exposure corresponds to the optical power of the VFL lens during that image exposure; and
an exposure time controller configured to control an image exposure timing used for a camera image,
wherein the system for utilizing the focus state calibration object comprises:
the calibration object comprising a planar tilted pattern surface on which a set of focus state reference regions (FSRRs) are distributed, wherein the FSRRs have known geometric relationships relative to the planar tilted pattern surface and have known region relationships relative to one another, and when the calibration object is arranged in a calibration object imaging configuration relative to the VFL lens system, the FSRRs are fixed at different respective effective focus positions relative to the objective lens and have respective reference region image locations (RRILs) in calibration object images; and
a computing system, comprising:
one or more processors; and
a memory coupled to the one or more processors and storing program instructions that when executed by the one or more processors cause the one or more processors to at least:
receive a plurality of camera images of the calibration object as acquired at different phase timings of the periodic modulation with the calibration object arranged in the calibration object imaging configuration relative to the VFL lens system; and
determine calibration data based at least in part on analyzing the plurality of camera images, wherein the calibration data indicates respective phase timings of the periodic modulation that correspond to respective effective focus positions.

23. The system of claim 22, wherein the VFL lens is a tunable acoustic gradient (TAG) lens.

* * * * *